United States Patent
Rameshkumar et al.

(10) Patent No.: US 12,061,469 B2
(45) Date of Patent: Aug. 13, 2024

(54) INTEGRATED SYSTEM FOR PREDICTING MAINTENANCE OF INDUSTRIAL ASSETS

(71) Applicant: Visionaize Inc., San Jose, CA (US)

(72) Inventors: Kannan Rameshkumar, Fremont, CA (US); Vikas Agrawal, Milpitas, CA (US)

(73) Assignee: Visionaize Inc., San Jose, CA (US)

( * ) Notice: Subject to any disclaimer, the term of this patent is extended or adjusted under 35 U.S.C. 154(b) by 0 days.

(21) Appl. No.: 18/404,958

(22) Filed: Jan. 5, 2024

(65) Prior Publication Data

US 2024/0241510 A1 Jul. 18, 2024

Related U.S. Application Data

(60) Provisional application No. 63/479,548, filed on Jan. 12, 2023.

(51) Int. Cl.
G05B 23/02 (2006.01)
(52) U.S. Cl.
CPC ....... *G05B 23/0283* (2013.01); *G05B 23/024* (2013.01)
(58) Field of Classification Search
CPC .......................... G05B 23/0283; G05B 23/024
See application file for complete search history.

(56) References Cited

U.S. PATENT DOCUMENTS

| | | | | |
|---|---|---|---|---|
| 2020/0118675 A1* | 4/2020 | Schriver | ............... | G05B 23/024 |
| 2021/0374886 A1* | 12/2021 | Reitz | ...................... | G06Q 50/16 |
| 2022/0392639 A1* | 12/2022 | McLean | ................. | G06N 3/045 |
| 2023/0123527 A1* | 4/2023 | Michael | ............. | G05B 23/0221 |
| | | | | 702/183 |
| 2023/0176557 A1* | 6/2023 | Cella | .................. | G05B 23/0283 |
| | | | | 700/117 |

* cited by examiner

*Primary Examiner* — Manuel A Rivera Vargas
(74) *Attorney, Agent, or Firm* — Kevin J Fournier Intellectual Property Legal Services Ltd.; Kevin J Fournier

(57) ABSTRACT

A system and method for predicting maintenance and providing optimized operational performance in industrial operations on a Metaverse platform, is described. In one aspect, the system implements AI/ML engines for anomaly detection and predictive analytics to control future failures, facilitate planned maintenance, and provide actionable recommendations to control future failures. The system combines data with AR/VR-based digital twin solutions for real-time troubleshooting and maintenance training. The system detects anomalies in industrial assets using sensor and IIoT data and provides predictive analytics for capturing failures and actionable recommendations, provides improved overall equipment effectiveness, enhanced device and system utilization, simulation of processes using data, and prescription uptime plans, achieving superior productivity gains and predictable uptime.

20 Claims, 10 Drawing Sheets

|  | TRUE/ACTUAL 722 | |
|---|---|---|
| | POSITIVE 724 | NEGATIVE 726 |
| POSITIVE 730 | TP 734 | FP 738 |
| NEGATIVE 732 | FN 736 | TN 740 |
| PREDICTED 728 | | |

CONFUSION MATRIX 742

|  | POSITIVE 708 | NEGATIVE 710 |
|---|---|---|
| POSITIVE 704 | TRUE POSITIVE (TP) 714 | FALSE POSITIVE (FP) 716 |
| NEGATIVE 706 | FALSE NEGATIVE (FN) 718 | TRUE NEGATIVE (TN) 720 |

PREDICTED LABEL 702

TRUE LABEL 712

FIG. 7

INTEGRATED SYSTEM FOR PREDICTING MAINTENANCE OF INDUSTRIAL ASSETS

CROSS-REFERENCE

This application claims the benefit of a U.S. provisional patent application under 35 U.S.C. § 119(e) filed on Jan. 12, 2023, in the U.S. Patent and Trademark Office and assigned Ser. No. 63/479,548, titled "SYSTEM AND METHOD FOR PREDICTING OUTCOMES OF INDUSTRIAL OPERATIONS ON METAVERSE PLATFORM," which is hereby incorporated by reference in their entirety.

TECHNICAL FIELD

Various embodiments of disclosure relate to a digital system that transforms information or data. More specifically, certain embodiments of the disclosure relate to a system and method for predicting the maintenance of physical systems and subsystems and simulation of industrial operations, thereby optimizing the uptime of an industrial facility.

BACKGROUND

A digital convergence of innovative technologies from multiple domains creates new opportunities in various sectors. For example, a synergistic combination of expertise from Operating Technologies (OT) and Information Technologies (IT) is resulting in the industry 4.0 revolution and beyond. Within OT companies, deep domain expertise is augmented with IT technologies, thereby stemming smart, interconnected, intelligent, and autonomous manufacturing equipment and systems. Industry 5.0 is adding human-centric, sustainable, and resilient concepts to the industrial revolution, preventing repetitive tasks that human workers may perform.

Various sectors of businesses (for example, manufacturing companies, industrial entities, etc.) powered by Industry 4.0 and beyond are facing transformational challenges amplified in recent years, resulting in various undesirable outcomes. For example, such undesirable outcomes may include unplanned downtime and failures because of maintenance or repairs, unexpected expensive equipment breakdown, unpredictable yield, reduced operational productivity and overall efficiency, increased operational costs, unutilized inventories, and higher safety risks for inexperienced workers. A holistic, robust, and digitally converged integrated system may be needed to overcome such challenges.

Further limitations and disadvantages of traditional approaches will become apparent to one of skill in the art through comparison of such systems with some aspects of the present disclosure as set forth in the remainder of the present application with reference to the drawings.

SUMMARY

Systems and methods are provided for predicting optimized operational performance and simulation of industrial operations using the metaverse platform, substantially as shown in and/or described in connection with at least one of the figures, as set forth more completely in the claims.

In an embodiment, a system and method for implementing a predictive maintenance framework in an industrial entity are provided. A predictive maintenance framework may be understood as a system that uses machine learning algorithms to predict future equipment failure and determine optimal maintenance schedules. It may be provided that the system and method receive a dataset (e.g., first dataset) from multiple data sources (e.g., first data sources), which includes data associated with multiple physical objects such as manufacturing equipment, material handling equipment, control systems, sensors, and process equipment. The first dataset serves as a foundation for the system to build its predictive models.

In an embodiment, it may be provided that the system and method may receive another dataset (e.g., a second dataset) from multiple data sources (e.g., second data sources), which includes data associated with multiple components of the physical objects that are related to historical maintenance data, historical failure data, data from external sources, and instruction manuals. Both datasets, for example, the first dataset and the second dataset, are used to train machine learning algorithms to generate the predictive models. Based on the first and second datasets, the system trains multiple machine-learning engines and executes operations to evaluate multiple outcomes generated by the machine-learning engine. The multiple outcomes indicate the status of one or more components associated with the physical objects.

In an embodiment, the system and method provided analyze one or more components of the physical objects by the machine learning engines, using one or more technical metrics associated with one or more components and one or more threshold values associated with one or more components. This analysis is used to determine the remaining useful life of one or more components associated with the physical objects. Based on the determination, the system and method generate one or more maintenance predictions on a user interface using the machine learning engines. One or more maintenance predictions are associated with one or more components or one or more subcomponents. The predictions are generated using a measure of key performance indicators associated with one or more components associated with the physical objects.

In an embodiment, the system and method may execute operations to modify and store the modified first dataset in one or more first data sources and the modified second dataset in one or more second data sources. The modified first dataset and the modified second dataset are generated using the generated one or more maintenance predictions and the determined remaining useful life of one or more components associated with the physical objects. Finally, the system and method may execute operations to re-train the multiple machine learning engines based on the modified first dataset and the modified second dataset.

These and other advantages, aspects, and novel features of the present disclosure, as well as details of an illustrated embodiment thereof, will be more fully understood from the following description and drawings.

BRIEF DESCRIPTION OF THE DRAWINGS

FIG. 7 is a block diagram showing variations of the modeling techniques for improving accuracies of predictive maintenance, according to an exemplary embodiment.

DETAILED DESCRIPTION

Figure 1:
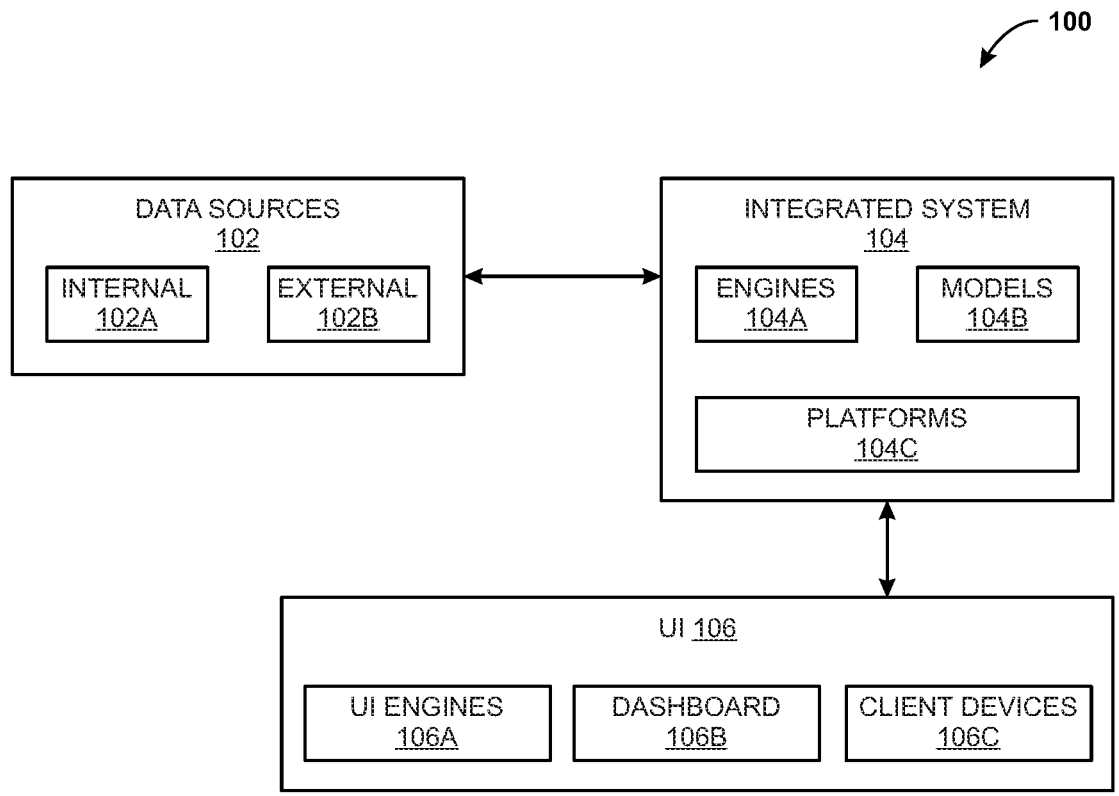
FIG. 1 is a block diagram showing an environment, including an integrated system that may be deployed in an industrial entity, according to an exemplary embodiment.

Technological advancements have propelled simplified ways to manage industrial entities or industrial facilities. For instance, in certain industrial facilities, such as an oil field facility, seamless operations management of assets or objects of the facility with minimal or no interruptions or downtime may be important. Further, managing larger facilities that include multiple physical assets or physical objects that may work in cooperation and have a centralized platform that enables provisioning insights into operations executed by the multiple physical assets may be vital. In an embodiment, integrated systems that are interconnected and provide information or data in real-time may be deployed in such industrial facilities. Such integrated systems may enable the monitoring and management of such facilities. For instance, the integrated systems may execute operations to model the facility's physical assets or physical objects and generate suitable mapping and maintenance information associated with the physical assets or physical objects in the industrial facility.

Various embodiments of the disclosure may be found in a system and method for predicting optimized performance and simulation of industrial operations. In existing systems, manufacturing operations suffer from unplanned downtime regarding productivity loss, excessive operation costs, and the like. With integrated solutions, the proposed system addresses such challenges by combining IIoT sensor-driven data analytics, AI, ML, AR, and VR to deliver superior productivity gains and higher levels of predictable uptime. The proposed system and method provide solutions for medium and large enterprises' manufacturing operations as a precursor to higher-order digital transformations and digital twin solutions. The proposed system and method demonstrate manufacturing transformations through integrated systems that provide digital solutions powered by IIoT, AI/ML, AR/VR, and lightweight shop floor digital twin technologies. The proposed system and method enable the real-time management of auto-generated manufacturing data and the delivery of actionable insights for decision-making. Thus, operations data is turned into a competitive advantage to achieve business KPIs.

In an embodiment, the system and method described may further enable the prediction of an optimized simulation of industrial operations using a Metaverse platform, providing many advantages. The operational objective is to move from unplanned downtime to planned downtime, thereby boosting productivity, optimizing processes, improving quality, upskilling the workforce, simplifying compliance, reducing costs related to maintenance, enabling extended asset life, decreasing downtime, and increasing workplace safety. For example, the proposed system and method in the manufacturing sector may bring unplanned failures in manufacturing floors into planned maintenance timeframes, thereby improving productivity, reducing operational costs and overall efficiency, and providing predictable yield improvements.

Embodiments of techniques related to a method, a system, and a non-transitory computer-readable device that implements an integrated system to predict outcomes and related maintenance predictions are described herein.

In an embodiment, the terms, for example, a system, a framework, or a platform, may be used interchangeably. It may also be referred to as an integrated system or an integrated framework that implements the system and method described in the subject specification. The integrated system may be deployed or implemented in an industry, for example, an industrial entity or manufacturing industry, and may execute operations and produce specific results or specific outcomes. In an embodiment, the facility may correspond to a structure disposed at a geographical location and associated with the operating entity. The facility may have multiple objects, i.e., one or more physical objects, which may facilitate performing various tasks based on business/industrial operations defined by the operating entity. Examples of facilities may include, for example, a refinery, a chemical plant, a building, a manufacturing unit, a dam, a bridge, a harbor, a railway facility, an underground facility, etc.

Physical assets that are disposed of in the facility may have corresponding physical objects. The physical objects may perform business and/or industrial operations or tasks the operating entity may define. In an embodiment, the integrated system can perform maintenance of one or more physical objects, reducing time and costs and improving accuracy. One or more physical objects may include distributed objects (such as a pipeline, an electrical grid, and a bridge) or discrete objects (such as a tower, a wind turbine, a gas flare, drilling/mining equipment, and a locomotive). One or more physical objects in the industrial entity may include components, subcomponents, systems, or subsystems, physical assets, assets, etc., hereinafter collectively or independently referred to as physical objects.

In an embodiment, physical objects may further include, for instance, manufacturing equipment (e.g., milling machines, extrusion machines, 3D printers, lathes, etc.), material handling equipment (e.g., forklifts, conveyor belts, cranes, pallet jacks, etc.), industrial robots (e.g., welding robots, assembly robots, pick and place robots, etc.), process equipment (e.g., boilers, heat exchangers, cooling towers, distillation columns), pneumatic and hydraulic equipment (e.g., hydraulic presses, pneumatic drills, pneumatic conveyors, etc.), control systems and sensors (e.g., programmable logic controllers (PLCs), sensors for automation and control, etc.), material processing equipment (e.g., crushers, grinders, separators, filters, etc.), etc. Each above-described physical object may include one or more components, subcomponents, etc. For example, such components or subcomponents in the manufacturing machines may include motors, belts and pulleys, gears, shafts, valves, sensors, control panels, circuit boards, filters, etc.

In an embodiment, one or more physical objects may enable the implementation of mechanical process systems deployed in discrete and complex facilities (such as manufacturing, chemical, oil, gas, and energy facilities). For example, in a refinery or a chemical plant, one or more physical objects may correspond to piping and equipment and process equipment with gas detectors. In another example, one or more physical objects may correspond to gas turbines in special devices, such as helicopters, relatively small power plants, jets, and tanks. In an embodiment, the integrated system may enable modeling the physical assets to include granular level details, including data associated with linked asset data of other physical assets in the facility. Further, the integrated system may provide information that may be consumed by key stakeholders, assigned users, administrators, managers, etc., of the facility and implement further action steps. The industrial entity may enable a reliable record of its assets, simplifying maintenance, improving decision-making, and reducing the risk of failures and/or downtime of the physical objects in the industrial entity.

In an embodiment, the integrated system may include and implement decision-based logic, multiple interfaces, engines and/or models, frameworks, one or more circuitries, and/or code executable by one or more circuitries. The engines and/or models, frameworks, platforms, infrastructure, etc., implemented by the integrated system, may execute operations or functions, either independently or in cooperation. An engine may correspond to a special purpose program or an executable code that performs or executes one or more core functions or operations. Modeling may correspond to a mechanism or a process that includes creating or improvising a functional or operational aspect of a system or one or more system features by referencing an existing or known knowledge base. The objective of the modeling process is to simplify the functional or operational aspect of the system or its features, making them easily understood, quantified, and visualized. By continually training the model with data from various sources, the mechanism for modeling can be automated. The engines and/or the models may implement the execution of one or more core functions or operations based on configuring one or more rules and/or one or more sequences of steps to produce specific outcomes. The engines and/or models may be configured to work independently or in conjunction with one or more engines or models.

The phrases "machine learning model" and "machine learning engine" refer to a model or engine trained using machine learning techniques. The dataset and algorithm train the machine learning model, enabling it to acquire and represent information from the dataset. Artificial intelligence can describe models that use simple or complex Neural Networks, deep learning techniques, and computer vision algorithms. Through data-driven learning, the AI model achieves predefined objectives.

FIG. 1 is a block diagram showing an environment 100, including an integrated system that may be deployed in an industrial entity, according to an exemplary embodiment. FIG. 1 shows a block diagram illustrating an environment 100 that includes a communicatively coupled arrangement of data sources 102, an integrated system 104, and a user interface (UI) 106 system. In an embodiment, the data sources 102 may include data or information from multiple repositories. For example, such repositories may include internal data 102A sources or repositories and external data 102B sources or repositories. The data stored in the internal data 102A repositories and/or the external data 102B repositories may interchangeably be referred to as a first data repository or a first data source and a second data repository or second data source. The data stored in the respective data sources or repositories may represent a first or second dataset.

In an embodiment, the integrated system 104 may include a communicatively coupled arrangement of engines 104A, models 104B, and platforms 104C that may execute operations independently or in cooperation. Executing operations independently or in cooperation may produce specific results or enable the achievement of specific objectives. Engines 104A, models 104B, platforms 104C, etc., may execute operations based on multidimensional data inputs. Such multidimensional data inputs from multiple data sources (e.g., external data 102B repositories, internal data 102A repositories, etc.) may be contextual. In an embodiment, the engines 104A, the models 104B, the platforms 104C, etc., may be trained based on the datasets (e.g., the first dataset, the second dataset, etc.) and may execute operations like augmenting the datasets, determining specific contextual or situation-based data or information, determining minimum and maximum threshold values that may apply for certain processes from historical data, etc.

Models 104B may be related to data classifier models or algorithms, in an embodiment. Models 104B may further provide modeling of the data based on specific criteria or rules. In an embodiment, the UI 106 system may include UI engines 106A, dashboards 106B, and client devices 106C that may be configured to receive results or outputs of execution of operations by the integrated system 104. The UI engines 106A, the dashboards 106B, and the client devices 106C may be configured to generate multiple UI elements or UI interfaces that may display results of execution of operations by the integrated system 104 or receive inputs from end users. The inputs received from the user may be received as modified information or a modified dataset by integrated system 104. Engines 104A and models 104B may be trained or retrained based on the modified dataset, and the results or output produced by engines 104A and models 104B may further be modified based on the modified dataset.

For example, the first dataset may include information associated with the physical objects such as manufacturing equipment (e.g., milling machines, extrusion machines, 3D printers, lathes, etc.), material handling equipment (e.g., forklifts, conveyor belts, cranes, pallet jacks, etc.), industrial robots (e.g., welding robots, assembly robots, pick and place robots, etc.), process equipment (e.g., boilers, heat exchangers, cooling towers, distillation columns), pneumatic and hydraulic equipment (e.g., hydraulic presses, pneumatic drills, pneumatic conveyors, etc.), control systems and sensors (e.g., programmable logic controllers (PLCs), sensors for automation and control, etc.), material processing equipment (e.g., crushers, grinders, separators, filters, etc.), etc. Each above-described physical object may include one or more components, subcomponents, etc. For example, such components or subcomponents in the manufacturing machines may include motors, belts and pulleys, gears, shafts, valves, sensors, control panels, circuit boards, filters, etc.

For example, the second dataset may correspond to or include information or data related to technical process metrics, such as those associated with historical failure patterns, historical maintenance data, and threshold values for optimally operating the parts/components or subcomponents. For example, the parts/components or subcomponents may include motors, belts and pulleys, gears, shafts, valves, sensors, control panels, circuit boards, filters, etc. The second dataset may also include information related to shelf life, optimum life, and maintenance data of the above-described components and subcomponents. Such data may be assimilated from external sources such as historical data or information (e.g., historical maintenance data, historical failure data, data patterns that may be indicative of failures in the future), instruction manuals, historical upgrades, or updates related to maintenance or optimal operating conditions of the components, subcomponents, etc. The second dataset may also include threshold values for optimum performance. When the threshold values are exceeded, the shelf life or optimum life of the components or subcomponents may decrease either exponentially or rapidly based on how much value or percentage the threshold values are exceeded. Such exceeding of the threshold values may result in anomalies that may degenerate the shelf life of the components and the subcomponents. Further, when the optimal values of operating the components or subcomponents consistently exceed the threshold values over a longer duration of time, the components or subcomponents may degenerate rapidly.

In an embodiment, the second dataset may further include multiple technical metrics related to key performance indicators (KPIs) associated with the components or the subcomponents of the physical objects in the entity. For example, such KPIs may be associated with: reliability that may correspond to a measure of the ability of the parts/components/subcomponents to perform their intended operations or functions without failure or breakdown over a specified period; durability that may correspond to a measure of the longevity or expected lifespan of the parts/components/subcomponents under normal operating conditions; efficiency that may include measures the ability of the parts/components/subcomponents to perform functions or operations with minimal energy consumption, waste, or loss; accuracy that may include measures the precision and accuracy of the parts/components/subcomponents in achieving the desired output or performance; maintenance requirements that may correspond to measures the frequency and complexity of maintenance activities required for the parts/components, including cleaning, lubrication, inspection, and repair; availability that may correspond to measures of the percentage of time that the parts/components/subcomponents are available and operational when needed;

compatibility that may correspond to measures of the ability of the parts/components/subcomponents to be integrated or used with other systems or equipment without compatibility issues.

In operation, the multiple models, and engines may be described in the subject specification with reference to FIG. 1, FIG. 2, FIG. 3, FIG. 4, and FIG. 9 and may further execute functions or operations, such as data normalization, analysis, and/or making determinations based on different circumstances and/or scenarios, analyzing and/or making determinations based on estimations, and analyzing and/or making determinations based on computations by using and applying context-based information and data.

Figure 2:
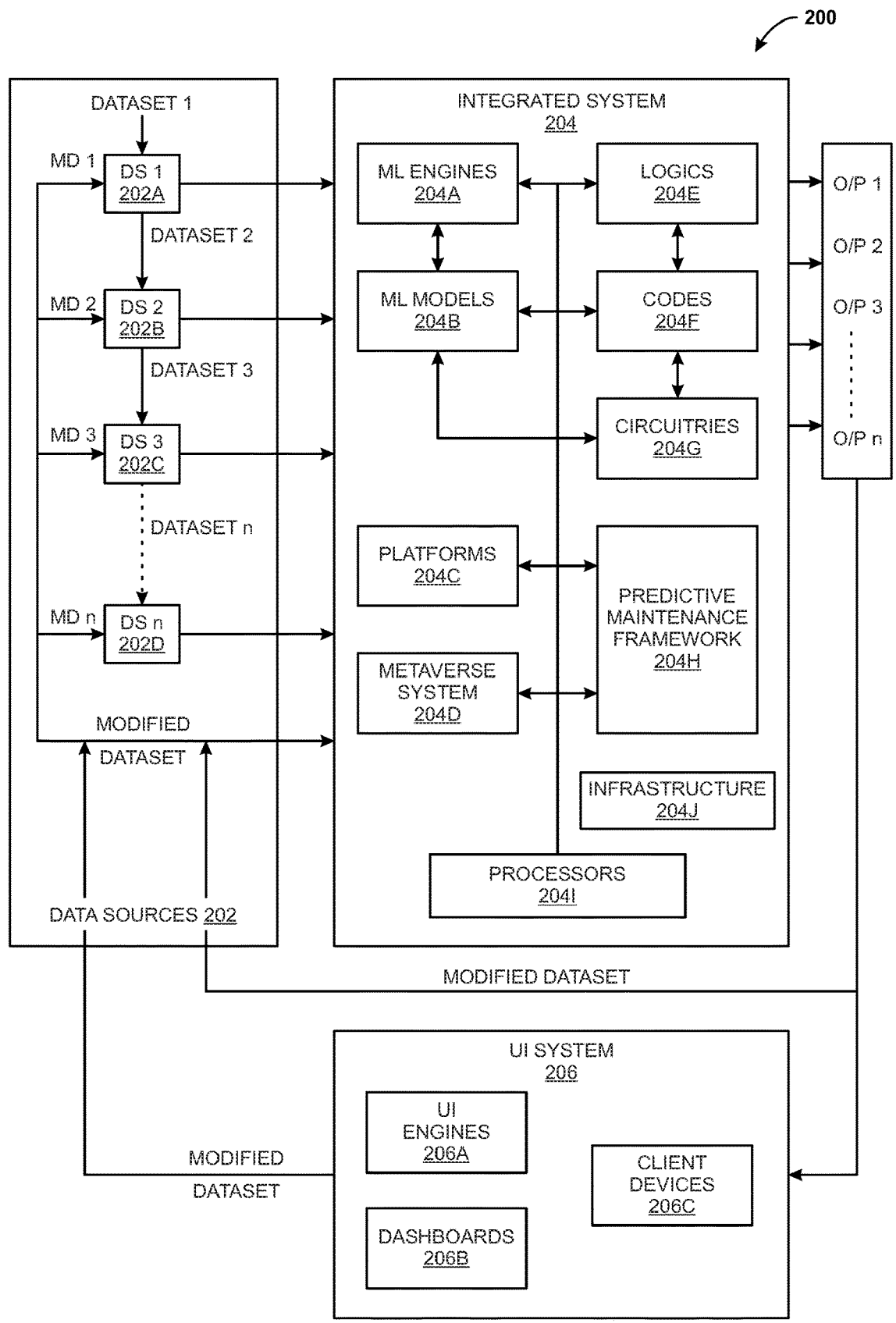
FIG. 2 is a block diagram showing an environment that includes an integrated system deployed in an industrial entity, according to an exemplary embodiment.

FIG. 2 is a block diagram showing an environment 200 that includes an integrated system deployed in an industrial entity, according to an exemplary embodiment. FIG. 2 is described in conjunction with FIG. 1. FIG. 2 shows an environment 200 that includes a communicatively coupled arrangement of data sources 202, an integrated system 204, and a UI system 206. As described with reference to FIG. 1, the data sources (e.g., 102 and 202) may include multiple data repositories (e.g., DS1 202A, DS2 202B, DS3 202C, . . . DSn 202D) respectively storing multiple datasets (e.g., DATASET 1, DATASET 2, DATASET 3, . . . DATASET n). In an embodiment, the data sources may source data or information from multiple repositories. For example, such repositories may include internal 102A data repositories and external 102B data repositories. The internal 102A data repositories and the internal 102B data repositories may store the data in multiple formats that may be pre-processed by the machine learning engines (e.g., 204A) and normalized by multiple machine learning engines 204A, machine learning models 204B, platforms 204C, Metaverse system 204D, predictive maintenance framework 204H, infrastructure 204J, etc. In an embodiment, the data sources 202 may include modified data (e.g., MD1, MD2, MD3, . . . MDn) that may be generated in response to the execution of operations by the integrated system 204. Further, the modified dataset may be generated or produced when external users provide inputs via the UI system 206. For example, the internal 102A data repositories may include data that is internal to the facility. For instance, such data may represent the data or information assimilated from sensors, programmable logic controllers (PLCs), etc., of Industrial Internet of Things (IIoT) connected systems. For example, the external 102B data repositories may include the data or information assimilated from sources that are external to the industrial entity. For instance, the external data sources may include the data or information associated with the health and typical maintenance cycles of the physical objects. The external data sources may source such data in real-time or use historical data, including the uptime of physical objects, the productivity of the physical objects, etc.

In an embodiment, the integrated system 204 may include multiple machine learning engines 204A, machine learning models 204B, platforms 204C, Metaverse systems 204D, logic 204E, codes 204F, circuitries 204G, predictive maintenance frameworks 204H, infrastructure 204J and processors 204I that may be communicatively coupled with each other. For instance, an engine or a machine learning engine may correspond to a special purpose program or an executable code that performs or executes one or more core functions or operations. The machine learning engines 204A and the machine learning models 204B may be trained in real-time or based on historical information or training data based on data from multiple data sources. The machine learning engines (e.g., 204A) and/or machine learning models (e.g., 204B) may be configured to execute operations or functions independently or in conjunction with one or more engines or models.

In an embodiment, the execution of operations by the machine learning engines 204A, the machine learning models 204B, etc., may produce outputs or specific outcomes (e.g., o/p1 1, o/p 2 2, o/p 3, . . . o/p n). The outputs or specific outcomes (e.g., o/p 1, o/p 2, o/p 3, . . . o/p n) may be received and displayed at the UI system 206. In an embodiment, the outputs, or specific outcomes (e.g., o/p 1, o/p 2, o/p 3, . . . o/p n) may represent a modified dataset. Further, the outputs or specific outcomes (e.g., o/p 1, o/p 2, o/p 3, . . . o/p n) may be used by the end-user or be modified through suitable user interfaces (UIs) (e.g., dashboards, screens, etc.) or computing devices (e.g., mobile phones, computers, PDAs, portable electronic equipment, etc.) in the UI system 206. The modified dataset (e.g., MD 1, MD 2, MD 3 . . . MD n) may be stored back into the multiple data stores (e.g., DS1 202A, DS2 202B . . . DSn 202D). Further, the modified dataset may train or retrain the machine learning engines 204A or the machine learning models 204B in the integrated system 204.

In an embodiment, the integrated system 204 may execute operations to perform multiple analyses. For instance, such an analysis may be performed in multiple dimensions. For example, such analysis may include performing determinations based on multiple threshold values associated with the operational aspects of the physical objects in the industrial entity. Based on the analysis, integrated system 204 may generate multiple multidimensional visualizations that may provide insights associated with a measure of key performance indicators (KPIs). For example, the KPIs may be associated with multiple processes, services, tasks, maintenance, etc., associated with the physical objects in the industrial entity. The generated insights may further provide insights into multiple processes, services, tasks, etc., that may be optimized or improved, thereby improving the manufacturing processes and minimizing the downtime of the industrial entity. The integrated system 204 may generate recommendations related to maintenance and determine remaining useful life, indicating the current status, anomalies, etc., associated with the physical objects.

In an embodiment, the integrated system 204 may implement the execution of operations of the machine learning engines 204A, the machine learning models 204B, the platforms 204C, the Metaverse system 204D, the predictive maintenance framework 204H via one or more logic (e.g., 204D), one or more circuitries (e.g., 204D), and/or one or more codes (e.g., 204E) executable by the processors (e.g., 2041). Such implementation may facilitate the execution of operations by the machine learning engine 204A, the machine learning models 204B, etc., the models and engines in the framework (e.g., predictive maintenance framework 204H), platforms (e.g., 204C), systems (e.g., Metaverse system 204D), etc., to get specific outcomes or achieve certain objectives. In an embodiment, the machine learning engines 204A and the machine learning models 204B may execute operations to augment datasets (e.g., the first datasets, the second datasets, modified datasets, etc.), perform contextual-based analysis and determinations based on the datasets (e.g., first datasets, second datasets, modified datasets, historical information, or historical datasets, etc.), perform situational based analysis and determinations based on the datasets (e.g., first datasets, second datasets, modified datasets, historical information, or historical datasets, etc.), etc.

In an embodiment, the UI system 206 may include UI engines 206A, dashboards 206B, and computing devices 206C that may display the integrated system's operations results 204. The UI engines 206A may be configured to generate UIs that may provision an interface to interact with the end users. For example, the UIs generated by the UI engines may be configured to receive inputs from end users, and based on these inputs (e.g., represented by modified datasets), the machine learning engines 204A and the machine learning models 204B may be trained or retrained. The mechanism of training or retraining the machine learning engines 204A or the machine learning models 204B may further enable improvising or refining the specific outcomes or specific results. In an embodiment, the refining or improvising may correspond to improving technical outcomes or technical metrics such as key performance indicators or key performance values, thereby leading to improvised predictions or estimations associated with the services, tasks, processes, and operational parameters associated with the physical objects in the industrial entity. The operations or functions of the overall entity may be maximized by implementing maintenance mechanisms that minimize the downtime of operations executed by the physical objects. The machine learning engines 204A, the machine learning models 204B, etc., may execute operations to perform computations or re-computations based on specific modifications of the dataset (e.g., the first dataset, the second dataset, etc., represented by the modified dataset) and may retrain the machine learning engines 204A and the machine learning models 204B thereby providing improvisation of the services, tasks, processes, operational parameters associated with the physical objects, etc.

Figure 3:
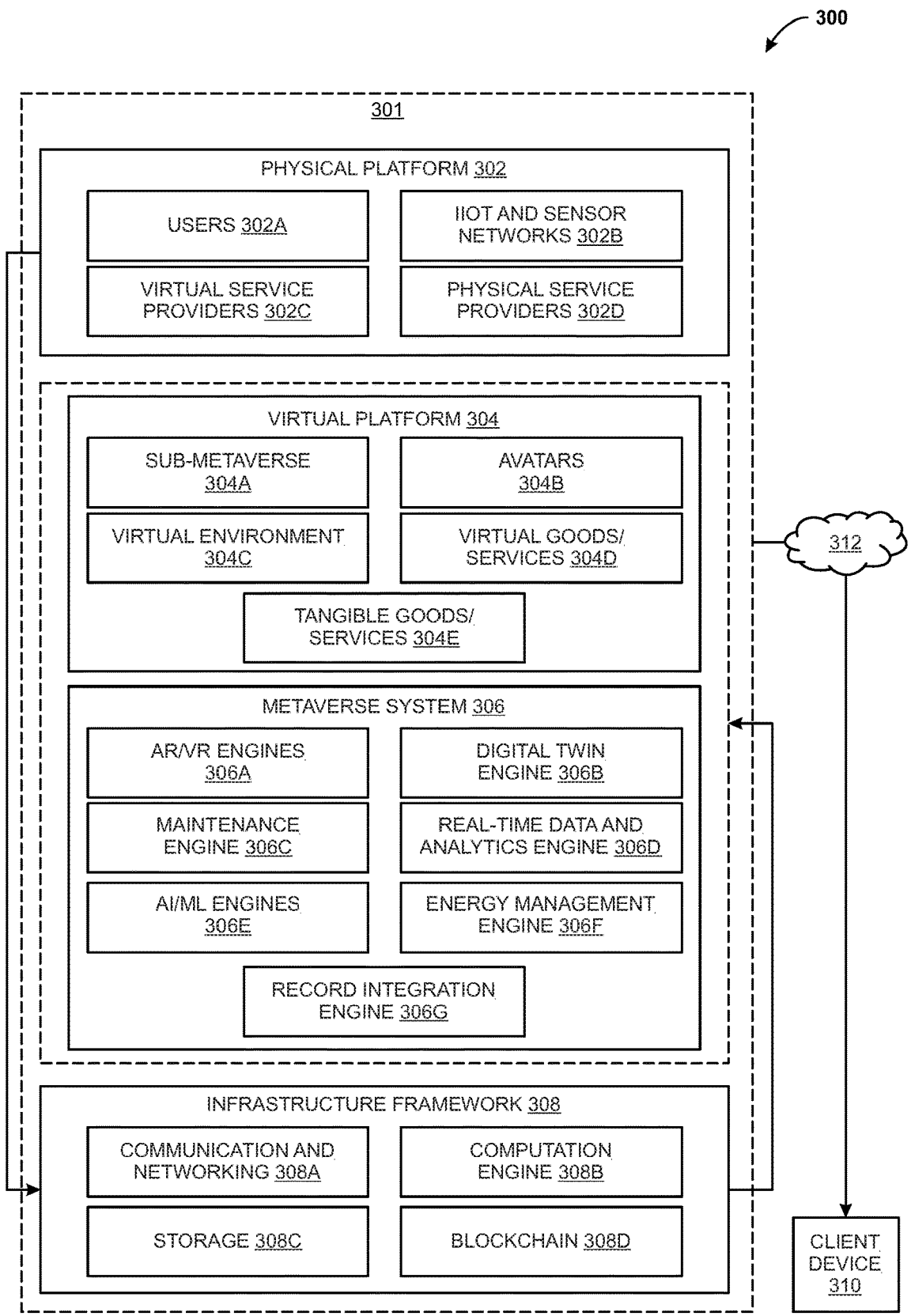
FIG. 3 is a block diagram showing components of platforms, systems, and infrastructure of the integrated system, according to an exemplary embodiment.

FIG. 3 is a block diagram showing components of platforms, systems, and infrastructure of the integrated system, according to an exemplary embodiment. FIG. 3 is described in conjunction with FIG. 1 and FIG. 2. FIG. 3 shows an environment 300 that includes a communicatively coupled arrangement of platforms, systems, and infrastructure, as shown and described in FIG. 2. In an embodiment, the platforms may include a physical platform 302, and a virtual platform 304, and the systems may include a Metaverse system 306. The physical platform 302, the virtual platform 304, the Metaverse system 306, and the infrastructure framework 308 may use cloud resources to implement a Metaverse platform 301 to provide metaverse-related operations or functions that an end user may consume via a client device 310. The client device 310 may communicate with the Metaverse platform 301 via a communication network 312.

The cloud resources may include various resources and/or services hosted remotely over a network, which may otherwise be referred to as the "cloud." In an embodiment, the cloud resources may be remotely hosted on servers in a data center (for example, remote application servers, such as a digital distribution platform and remote database servers). The cloud resources' services, resources, and/or functionalities may be used by or for edge resources via a combination of local and wide area networks. For example, cloud resources may include industrial or organizational equipment/processes/resources, outsourced storage, processing power, databases, networking, analytics, artificial intelligence engines, navigation services, geolocation services, network or infrastructure management, payment processing, audio and video streaming, messaging, social networking, news, and software applications.

In an embodiment, the cloud resources may deliver cloud computing for the Metaverse platform 301 over the communication network 312. Thus, cloud resources may provide the Metaverse platform 301 with flexible resources, faster innovation, and economies of scale. In other embodiments, different components of the Metaverse platform 301 performing corresponding functionalities may be partially or fully implemented by various cloud resources as an integrated or distributed platform.

Referring to FIG. 3, the physical platform 302 may be integrated with the infrastructure framework 308 and implemented as a single layer. Implementing the physical platform 302 and infrastructure framework 308 may be independent without deviating from the disclosure's scope. The physical platform 302 comprises users 302A, IIoT, and sensor networks 302B, virtual service providers 302C, and physical service providers 302D. The users 302A may execute multiple actions to interact with other users and/or virtual objects. The users 302A may experience the virtual worlds related to the industrial entity through head-mounted displays (HMDs), VR equipment, or AR goggles. In an embodiment, the IIoT, and sensor networks 302B may be deployed in the physical platform 302 to collect data from the environment, for example, the physical objects in the industrial entity. IIoT sensor data is leveraged for anomaly detection and trigger warnings for machine breakdown and failures. Sensor networks may be independently owned by sensing service providers that provide live data feeds to the virtual service providers 302C.

In an embodiment, the virtual service providers 302C may develop and maintain the virtual worlds of the metaverse and enrich the metaverse with user-generated content, such as games, social applications, and operational applications. The physical service providers 302D may operate the physical infrastructure that supports the Metaverse system 306. The physical service providers 302D may further respond to transaction requests that originate from the Metaverse system 306, for example, operations of communication and computation resources at the edge of the network or logistics services for the delivery of physical goods transacted in the Metaverse system 306.

The virtual platform 304 may comprise a series of interconnected distributed virtual worlds, such as sub-metaverses 304A. Each sub-metaverse may offer a specific type of service (for example, machine-level digital twin, 3D Virtualized training and step-by-step maintenance support, gaming, social dating, and online concerts) to users represented as avatars 304B for virtual world navigation. The virtual platform 304 may include a virtual environment 304C, virtual goods/services 304D, and tangible goods/services 304E. The virtual environment 304C, such as a virtual industrial workspace, may be implemented based on the IIOT and sensor networks 302B, and the virtual service providers 302C. The virtual goods/services 304D, such as virtual concerts, may be realized by the virtual service providers 102C. The tangible goods/services 304E, such as e-commerce and logistics, may be realized by the physical service providers 302D. The composition of the virtual platform 304 may be as, for example, IEEE 2888 standards.

In an embodiment, the Metaverse system 306 may receive inputs from the physical platform 302 and the data sources. Based on the inputs, the Metaverse system 306 may generate, maintain, and enhance the virtual platform 304. The Metaverse system 306 may include AR/VR engines 306A, a digital twin engine 306B, a maintenance engine 306C, a real-time data and analytics engine 306D, an AI/ML engine 306E, an energy management engine 306F, and a record integration engine 306G. In an embodiment, the AR engine from the AR/VR engines 306A may enable onsite operators to perform troubleshooting by a remote team of experts. VR engine from the AR/VR engines 306A may enable users to train remotely on multiple makes and models of equipment.

In an embodiment, the digital twin engine 306B may comprise suitable logic, circuitry, and interfaces that may be configured to develop a lightweight shop floor ML-powered digital twin based on insights derived from the collected data from the IIOT and sensor networks 302B. The digital twin replicates the physical platform 302, providing rich information and enabling simulations to explore intended actions. The digital twin may perform machine breakdown and scenario analysis using a visualized 3D representation of the machine for gauging machine performance. The maintenance engine 306C may comprise suitable logic, circuitry, and interfaces that may be configured to perform predictive maintenance, wherein advanced analytics are performed using predictive scores to reduce the risk of unexpected malfunctions and downtime. In an embodiment, the predictive scores may be computed in multiple ways. For example, data from multiple sensors that may be associated with the physical objects and provide information on a particular failure type may be monitored. Such monitored information or data may enable the calculation of predictive scores, which are then correlated to real-time failures or the absence thereof. The predictive scores may be computed iteratively for different failure types and/or different failure scenarios of the physical objects. The maintenance engine 306C may execute operations to compute a continuous predictive score for each piece of equipment (e.g., each physical object) and each failure type. The real-time data and analytics engine 306D may comprise suitable logic (e.g., 204E), circuitry (e.g., 204G), and interfaces that may be configured to analyze real-time data to find patterns, detect faults, and create a visualization to monitor KPIs for effective decision-making.

In an embodiment, the AI/ML engine 306E may include suitable logic, circuitry, and interfaces that can be configured to monitor the performance, energy, use, temperature of the environment, spills, and leaks of the equipment to enhance process efficiency and workplace safety continuously. The energy management engine 306f may comprise suitable logic, circuitry, and interfaces configured to pinpoint energy loss points, leveraging spatial visualization for effective emissions management, thereby reducing energy and fuel consumption. The record integration engine 306G may comprise suitable logic, circuitry, and interfaces that may be configured to enable the integration of all systems to negate the effect of data silos to drive operational decisions for enhanced efficiency and productivity. The infrastructure framework 308 is the layer that enables the Metaverse system 306 to be accessed at the edge. The infrastructure framework 308 may include, for example, communication and networking 308A, computation engine 308B, storage 308C, and blockchain 308D.

In an embodiment, the communication and networking 308A may comprise suitable logic, circuitry, and interfaces that may be configured to provide ubiquitous network access. The communication and networking 308A may provide unique features of accessibility, mobility, and scalability, making wireless communication indispensable in the Metaverse platform 301. The communication and networking 308A may facilitate the real-time transmission of large volumes of data between the virtual and real worlds and within the sub-metaverses 304A. The networking technologies may empower communication and networking 308A, for example, the IoT, the software-defined network (SDN), 5G, and 6G.

The computation engine 308B may comprise suitable logic, circuitry, and interfaces that may be configured to offer powerful computations with the help of cloud-edge-end computing, as a massive number of frames are generated per second in the virtual world. The computation engine 308B may include multiple controllers for controlling various system components and predicting optimized simulations of industrial operations on the Metaverse platform 301. In an embodiment, the controller may control the various components based on user input and/or closed-loop feedback signals. The computing functionalities of the controller disclosed herein may be implemented in one or more silicon cores in reduced instruction set computing (RISC) processors, ASIC processors, complex instruction set computing (CISC) processors, FPGAs, and other semiconductor chips, processors, or control circuits.

In an embodiment, the storage 308C may comprise suitable logic, circuitry, and interfaces that may be configured to provide object storage platforms, such as AWS S3®, for storing objects generated in the Metaverse platform 301. In an embodiment, the storage 308C may be further configured to store a large volume of structured, semi-structured, and unstructured data in its native format with no fixed limits on account size or file. In an embodiment, the storage 308C may be referred to as data lakes, which store a large volume of data for increased analytical performance and native integration. In another embodiment, storage 308C may be further configured to collect and manage data from varied sources to provide meaningful business insights. In an embodiment, the storage 308c may be referred to as a data warehouse, a blend of technologies and components for strategically using data. The data warehouse may be an electronic storage of a large volume of information designed for query and analysis instead of transaction processing. The data warehouse may be configured to transform data into meaningful information.

The storage 308C may correspond to a memory unit for storing many application programs or applications, operational data, and commands. The memory may store information and/or instructions for use in combination with the controller. The memory may include volatile and non-volatile memory, such as random-access memory (RAM) and read-only memory (ROM). Many program modules may be stored on the hard disk, external disk, ROM, or RAM, including an operating system (not shown), one or more application programs, other program modules (not shown), and program data. The RAM may be of any type, such as Static RAM (SRAM), Dynamic RAM (DRAM), or Synchronous Dynamic RAM (SDRAM). A basic input/output system (BIOS) containing the basic routines that help transfer information between system elements, such as during start-up, may be stored in the ROM.

The blockchain 308D may comprise suitable logic, circuitry, and interfaces that may be configured to store, as a distributed database, the large volume of data generated in the Metaverse platform 301, for example, user-generated content and IoT data. The blockchain 308D may decentralize storage, improve scalability, reduce data transmission, and ensure data security and privacy. The blockchain 308D may further manage edge resources, protect the value of virtual goods, enable secure data interoperability, and facilitate peer-to-peer trading in a decentralized environment. For example, a non-fungible token (NFT) marks the uniqueness of a virtual asset and authenticates ownership of the asset.

The client device 310 may correspond to a device associated with an end user that may initiate requests for the Metaverse platform 301 and receive a response from the Metaverse platform 301. In an embodiment, the client device 310 may be an electronic device associated with an organization, an industry, or a factory. Examples of the client device 310 may include a smartphone, a tablet personal computer (PC), a slate PC, a personal digital assistant (PDA), an Ultrabook, a wearable electronic device (such as smart clothing, head-mounted display (HMD), or smart glasses), a smart television, a desktop computer, a laptop computer, and other such electronic devices and Internet Protocol (IP) appliances.

The communication network 312 may be configured to provide multiple network ports and communication channels for transmitting and receiving communication data. The communication data may correspond to data received and/or exchanged via the communication network 312 among the edge and cloud resources. Each network port may correspond to a virtual address (or a physical machine address) for transmitting and receiving the communication data. For example, the virtual address may be an Internet Protocol version 4 (IPV4) or an Internet Protocol version 6 (IPv6) address, and the physical address may be a media access control (MAC) address. The communication data may be transmitted or received via a communication protocol, the examples of which may include, for example, a short-range communication protocol, a Hypertext Transfer Protocol (HTTP), a File Transfer Protocol (FTP), a Simple Mail Transfer Protocol (SMTP), a Domain Name Server (DNS) protocol, and a Common Management Information Protocol (CMIP) Over Transmission Control Protocol/Internet Protocol TCP/IP (CMOT).

The communication data may be transmitted or received via at least one communication channel of multiple communication channels. The communication channels may include a wireless channel, a wired channel, or a combination of wireless and wired channels. The wireless or wired channel may be associated with a data standard which may be defined by one of a Local Area Network (LAN), a Personal Area Network (PAN), a wireless personal LAN (WPLAN), a Wireless Local Area Network (WLAN), a Wireless Sensor Network (WSN), a WAN, and a Wireless Wide Area Network (WWAN), the Internet, cellular networks, Wireless Fidelity (Wi-Fi) networks, short-range networks (for example, Bluetooth® or ZigBee®), and/or any other wired or wireless communication networks or mediums.

In an embodiment, the wired channel may be selected based on the bandwidth criteria. For example, an optical fiber channel may be used for high-bandwidth communication, and a coaxial cable (or Ethernet-based communication channel) may be used for moderate bandwidth communication. According to various embodiments, any, some, combination, or all of the systems, engines, and/or sub-systems of the network environment 100 may be adapted to execute any operating system, such as Linux-based operating systems, UNIX-based operating systems, Microsoft Windows, Windows Server, macOS, Apple® iOS®, Google® Android®, or other customized and/or proprietary operating system. The systems, engines, and/or sub-systems of the network environment 100 may be adapted to execute such operating systems along with virtual machines adapted to virtualize execution of a particular operating system.

In operation, all the sensor and IIOT data from the IIOT and sensor networks 302b of the physical platform 302 is transmitted to the data lake or data warehouse at the storage 308C of the infrastructure framework 308 in a time series format. Examples of sensor data may include supervisory control and data acquisition (SCADA), programmable logic controller (PLC), other sensors, and energy management systems. The Metaverse system 306 may use AR/VR engines 306a and AI/ML engine 306e to facilitate better overall equipment effectiveness (OEE), better device and system utilization, simulation of processes using data, and predicting with prescription uptime plans that are realistic and thus productivity enhancing.

The Metaverse system 306 may process actual equipment, system failure, performance, and downtime data/information and parlay it to the data in the data lake. The Metaverse system 306 may implement the execution of proprietary AI/ML algorithms to perform real-time analytics, information contextualization, and required visualization and performance anomaly detection failure pattern recognition. The Metaverse system 306 may provide predictive and prescriptive recommendations to keep uptime high per plan and reduce unplanned downtime to low or near zero. In an embodiment, providing predictive recommendations may be based on and may include correlating data from a finite set of sensor data in real-time. Upon correlating data from the finite set of sensors, the anomalies associated may be determined, and alerts for specific internal actions may be instantiated. In an embodiment, providing prescriptive recommendations may be based on and include evaluating data in real-time over some time (e.g., weeks, months, or years), combining the evaluated data with historical failure data as well as adjacent, secondary, and tertiary failures and instantiating alerts for proactive intervention to prevent possible future failures. For example, a failure that is likely to occur in a specific period, for example, 4 months, maybe determined and flagged so that suitable intervention may be planned way prior to that failure.

In an embodiment, the Metaverse system 306 may be configured to augment the data with AR/VR-based digital twin solutions and overlay AI. The Metaverse system 306 may execute real-time operations for performing troubleshooting/maintenance training on the equipment and machinery, making the production staff work efficiently. For example, the Metaverse system 306 may be configured to collect all the relevant data from the ingredient mix readiness tests, sensors in the line, physical objects, machine/equipment/subsystem performance details from the product line, and product acceptance tests into the data lake. The Metaverse system 306, in cooperation with the machine learning engines 204A, and the machine learning models 204B, may be configured to train the proprietary AI algorithms that may be implemented by the machine learning engines (e.g., 204A, 306C, 306E, etc.). The machine learning engines (e.g., 204A, 306C, 306E, etc.) may use the data in the data lakes from a historical and real-time perspective. The machine learning engines (e.g., 204A, 306C, 306E, etc.) may perform multiple analyses that may be driven in multi-state machine modes with many open-and-closed loop conditions/segments. The Metaverse system 306 may be configured to correlate such data into varying parameters and recommend a "what if outcome" based on parameter consideration. The Metaverse system 306, in cooperation with the machine learning engines (e.g., 204A, 306C, 306E, etc.), and the predictive maintenance framework 204H may optimize the simulations and deliver the result in real-time, as the effect of product changes on productivity is predicted even before the actual changes are considered.

Figure 4:
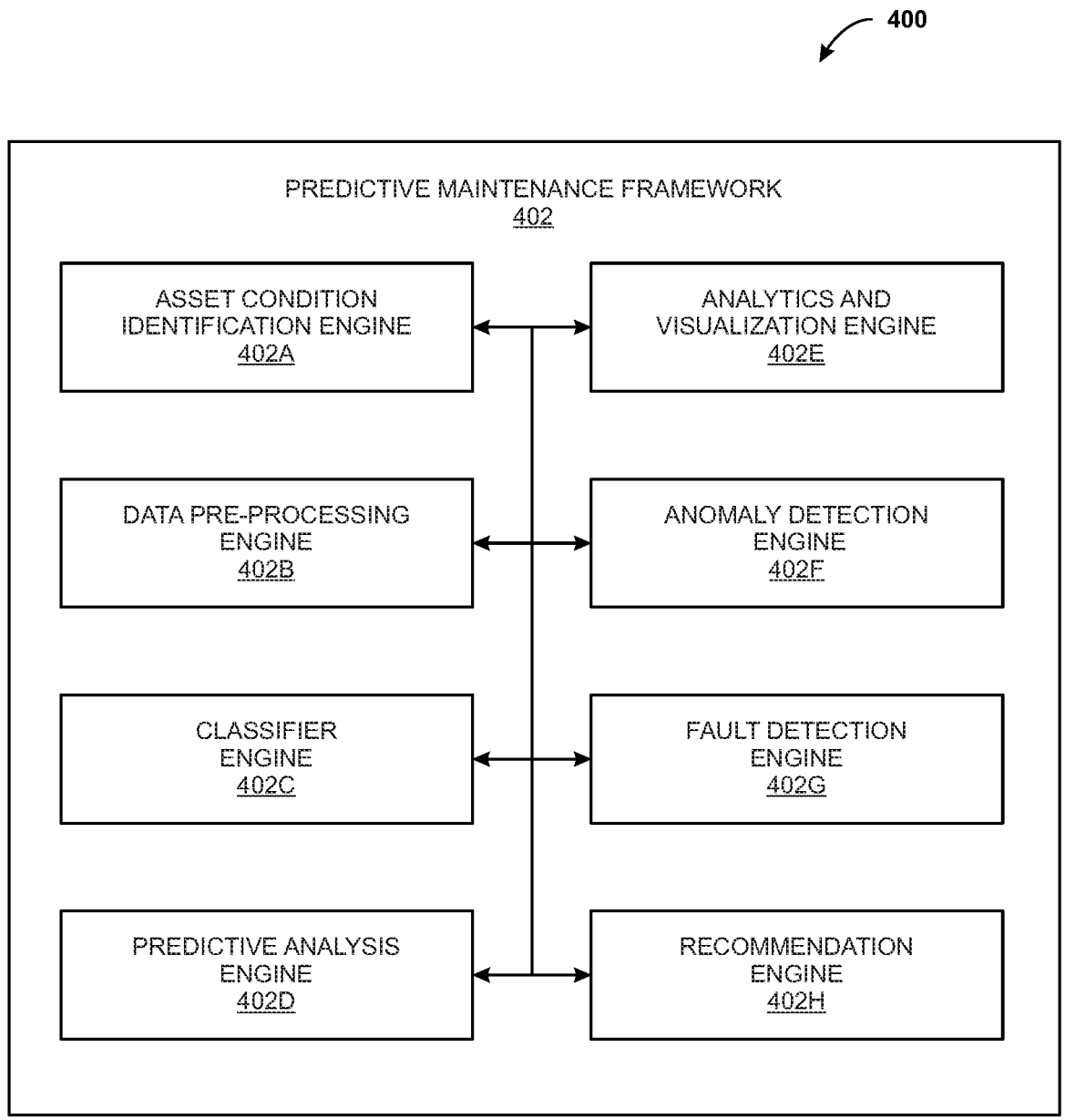
FIG. 4 is a block diagram showing a predictive maintenance framework of the integrated system, according to an exemplary embodiment.

FIG. 4 is a block diagram showing a predictive maintenance framework 402, 204H of the integrated system, according to an exemplary embodiment. FIG. 4 is described in conjunction with FIG. 2. FIG. 4 shows a block diagram 400, including a predictive maintenance framework 402, 204H of the integrated system 204. In an embodiment, the predictive maintenance framework 402, 204H includes a communicatively coupled arrangement of multiple engines (e.g., 402A, 402B, 402C, 402D, 402E, 402F, 402G, and 402H) that may execute operations to achieve specific results or outcomes.

In an embodiment, predictive maintenance may correspond to a mechanism that implements the integrated system 204 to generate advanced maintenance-related forecasting through advanced computations and analysis techniques. For instance, the predictive maintenance framework 402, 204H may use real-time data and information from physical objects, systems, and subsystems that may be assimilated or collected via interconnected systems. For example, such interconnected systems may include multiple sensors, historical data, performance data associated with the physical assets, systems, subsystems, etc. The data or information assimilated from the physical assets, the systems, the subsystems, etc., may be analyzed in the context of the data assimilated from multiple data sources and data lakes.

In an embodiment, the above-described predictive maintenance may provide further information or data, including insights on the remaining useful life of the components or subcomponents of the physical assets, the subsystems, the systems, etc. Such data or information may enable fault prognosis and provide inputs for planning and management to maintain the physical assets, the subsystems, the systems, etc. The current status of the components or subcomponents of the physical assets may indicate the remainder life or remaining useful life and associated anomalies.

Referring to FIG. 4, the predictive maintenance framework 402, 204H includes an asset condition identification engine 402A, a data pre-processing engine 402B, a classifier engine 402C, a predictive analysis engine 402D, an analytics and visualization engine 402E, an anomaly detection engine 402F, a fault detection engine 402G, and a recommendation engine 402H. The predictive maintenance framework 204H may cooperatively work with the machine learning engines 204A, the machine learning models 204B, the platforms 204C, the Metaverse system 204D, the logic 204E, the codes 204F, the circuitries 204G, and the infrastructure 204J layer.

In an embodiment, the asset condition identification engine 402A may execute operations to determine the current status of the physical assets or the physical objects in the industrial entity. For example, the sensors associated with physical objects may send or transmit data from upstream and downstream sensors. For the upstream and downstream sensors associated with the physical asset that is monitored, one or more predetermined rules associated with the physical object or asset health conditions may be applied to determine the asset or physical object conditions and determine the time to failure prediction. Such information may include information or data associated with key performance indicators associated with the working condition of the physical objects. The working conditions may indicate the efficiency and reference parameters associated with the physical objects. Further, the data pre-processing engine 402B may execute operations to pre-preprocess the data received from multiple data sources (e.g., 202A through 202D). For example, the pre-processing steps may include data normalization, data clean-up, formatting, etc. The pre-processing steps may additionally include removing noise or unwanted data.

In an embodiment, the classifier engine 402C may execute operations for classifying the data. The classifier engine 402C may include implementing classifier algorithms or decision-based logic and deep learning algorithms for executing specific operations on classifying the data. For example, the machine learning models (e.g., 204B) and the machine learning engines (e.g., 204A) may be trained using different types of data. The integrated system 204 may identify such different types of data based on the identifiers associated with the data. Further, the data pre-processing engine 402B may process the data, and the data that may be processed may be labeled or classified as raw sensor data. Further, the health data associated with the physical objects, the input sensor data, the output sensor data, etc., may be combined with a decision logic, and the data may be classified by the classifier engine 402C in a certain way. In an embodiment, the classifier algorithms may train the machine learning models (e.g., 204B) of the integrated system 204 that may provision or enable iteratively modifying or adjusting the classifier weights of the data. For example, the classifier weights may be associated with optimal or reference values associated with key performance indicators of the physical objects. In an embodiment, multiple classifier weights may be adjusted or modified by the machine learning engines (e.g., 204A) such that the machine learning models (e.g., 204B) are updated iteratively. Such iterative updates may be based on modifications in the data in real-time. For example, the classifier weights may be adjusted such that in each iteration, there is a convergence in the accuracy of predictions of uncommon observations.

In an embodiment, the classifier weights may be adjusted for adaptively boosting, for example, parameters associated with the performance and/or efficiency. The classifier weights may be adjusted or modified by using them in conjunction with many other statistical and learning algorithms to boost performance and efficiency adaptively. The classifier weights may be adaptively and iteratively adjusted or modified. For example, a first decision logic may include increasing the weight of incorrect decisions and decreasing the weight of correct decisions between sequences. A second decision logic may include increasing the weight of correct decisions and decreasing the weight of incorrect decisions. Since the mechanism for adjusting or modifying the classifier weights is adaptive, a combination of the first decision logic and the second logic may also be implemented to adjust or modify the classifier weights.

In an embodiment, the predictive analysis engine 402D may execute operations to perform analysis and enable the generation of predictions with reference to the working condition of the physical assets or physical objects in the industrial entity. For instance, such analysis may be associated with key performance metrics of the components of the physical assets, the systems, the subsystems, etc., thereby generating multiple insights and forecasts that may predict failure. For example, the failure predictions may be associated with specific components or subcomponents of the physical assets, the subsystems, the systems, etc., based on historical data related to failure patterns. In an embodiment, the analytics and visualization engine 402E may execute operations to generate visualizations that may provide insights with reference to key performance indicators associated with the physical assets or physical objects that may predict failure. The fault detection engine may execute operations to detect or determine faults associated with the physical objects in the industrial entity.

Referring to FIG. 4, the predictive maintenance framework 402, 204H may receive data or information from multiple data sources (e.g., 202A through 202D). For example, multiple data sources (e.g., 202A through 202D) may include internal data sources within the industrial entity, such as industrial systems, physical objects, etc. Further, the data received by the predictive maintenance framework 204H may be assimilated from multiple data lakes. In an embodiment, such data lakes may include multiple banks of sensors that may be associated with key performance attributes or key performance indicators associated with the physical objects in the industrial entity, time series data associated with the physical objects, etc. For example, the time series data may correspond to attributes or parameters associated with the physical objects that may include, for example, revolutions per minute (rpm) and multiple attributes associated with the temperature (e.g., the temperature of operating temperatures of the physical objects, the ambient temperature in and around the physical objects, etc.).

In an embodiment, further data may include key performance attributes, or the key performance indicators may be associated with multiple attributes associated with the vibrations (e.g., the vibrations produced by the components or the subcomponents of the physical objects, the vibrations that are affected by the other components or subcomponents of the physical objects in close vicinity to each other, the vibrations produced by the physical objects or the vibrations produced by other physical objects in vicinity to the other, etc.). Further data may include key performance attributes or the key performance indicators may be associated with multiple attributes associated with airflow to and from the physical objects. Further, data may include key performance attributes, or the key performance indicators may be associated with energy consumption and energy consumption patterns associated with the physical objects.

In an embodiment, the key performance attributes or the key performance indicators described above may be associated with different parameters that are being monitored in the industrial entity and may train the machine learning engines (e.g., 402A through 402H) in the predictive maintenance framework 402. For example, the machine learning engines (e.g., 402A through 402H) in the predictive maintenance framework 402 working in cooperation with the machine learning models of the integrated system 204 may additionally be trained from the data or information from other data sources (e.g., 202).

In an embodiment, the anomaly detection engine 402F may execute operations to detect anomalies associated with the industrial entity's physical assets or physical objects. Further, the anomaly detection engine 402F may execute operations, such as determining threshold values associated with the key performance attributes or key performance indicators associated with the above-described parameters being monitored. When the parameters being monitored are below certain threshold values, the integrated system 204 may be configured to provide such information to the end users via the UI system 206. When the parameters being monitored are above or within certain threshold values, the integrated system 204, in cooperation with the recommendation engine 402H, may provide recommendations via the UI system 206. For example, consider that revolutions per minute (RPM) and temperature attributes of the data associated with the physical object, for example, a rotary machine, are being monitored. Suppose that the temperature on the rotary machine goes above a set threshold, but the RPM is within threshold values, then an alert is sent via UI. However, suppose the RPM values are also off the threshold values. In that case, the machine learning engines (e.g., 204A, 402A through 402G) and the machine learning models (e.g., 204B) may cooperatively execute operations by combining logic and may generate alerts and recommendations that may necessitate a closer inspection and explore situations for overload or runaway conditions and intervene before catastrophic failure.

In an embodiment, the recommendation engine 204 may execute operations to provide recommendations on the conditions of the physical objects in the industrial entity. For example, the recommendation engine 402H, in cooperation with the machine learning engines (e.g., 204A, 402A through 402G) and the machine learning models (e.g., 204B), may generate and provide alerts to the end users via the UI system 206. In an embodiment, the anomaly detection engine 402F, in cooperation with the predictive analysis engine 402D and the recommendation engine 402H, may execute operations to perform anomaly detection analytics on failure patterns and provide predictive analytics for capturing failures and making actionable recommendations to bring future failures into planned maintenance/downtime windows.

In an embodiment, the data or information from the data sources (e.g., 202A through 202D) may include data or information related to historical failure patterns or run-to-failure patterns of the physical objects. This data or information may further be augmented or based on recommendations that may be historically generated. For example, the machine learning engines (e.g., 204A, 402A through 402H) and the machine learning models (e.g., 204B) in cooperation with the anomaly detection engine 402F and the recommendation engine 402H may be configured to generate predictions related to failure patterns. In an embodiment, the machine learning engines (e.g., 204A, 402A through 402H) and the machine learning models (e.g., 402B) in cooperation with the recommendation engine (e.g., 402H) and the anomaly detection engine (e.g., 402F) may execute operations to perform analysis based on causal inferencing from historical failure patterns. For example, the above-described analysis may generate insights that may be predictive and prescriptive. The anomaly detection engine 402F, in cooperation with the recommendation engine 402H, may execute operations to evaluate outcomes based on the analysis. In an embodiment, the anomaly detection engine 402F may cooperatively execute operations with the asset condition identification engine 402A and the fault detection engine 402G to perform preliminary analysis. The results of the preliminary analysis may then be input to the predictive analysis engine 402D which may cooperatively execute operations with the recommendation engine 402H to generate the alerts and triggers, including recommendations for interventions to prevent failures.

In an embodiment, the classifier algorithms or models for training the machine learning engines (e.g., 204A, 402A through 402H) or the machine learning models (e.g., 204B) may include an implementation of an ensemble meta-estimator that matches base classifiers on random subsets of the original dataset. Further, the individual predictions may be aggregated, for example, by voting/choosing or by averaging means to determine final aggregated predictions. In an embodiment, a decision logic to average and determine final aggregated predictions may be implemented based on, for example, a bagging classifier. The bagging classifier may be an ensemble meta-estimator that may fit the base classifiers on each random subset of the original dataset and then aggregate their predictions (either by voting or by averaging) to form a final prediction. In another embodiment, the decision logic may be implemented based on a random forest classifier. The random forest classifier may be a typical, for example, bagging classifier algorithm that includes multiple decision trees trained on the various subsets of the data. The random forest classifier may implement the bagging mechanism to sample the dataset and perform random replacements of the sampled subsets of data. In an embodiment, the classifier algorithms or models for training the machine learning engines (e.g., 204A, 402A through 402H) or the machine learning models (e.g., 204B) may include a set of decision trees from a randomly selected subset of the training set. A random subset from the training set may be selected, and votes or choices from multiple decision trees may be selected to determine the final prediction.

Figures 5A, 5B:
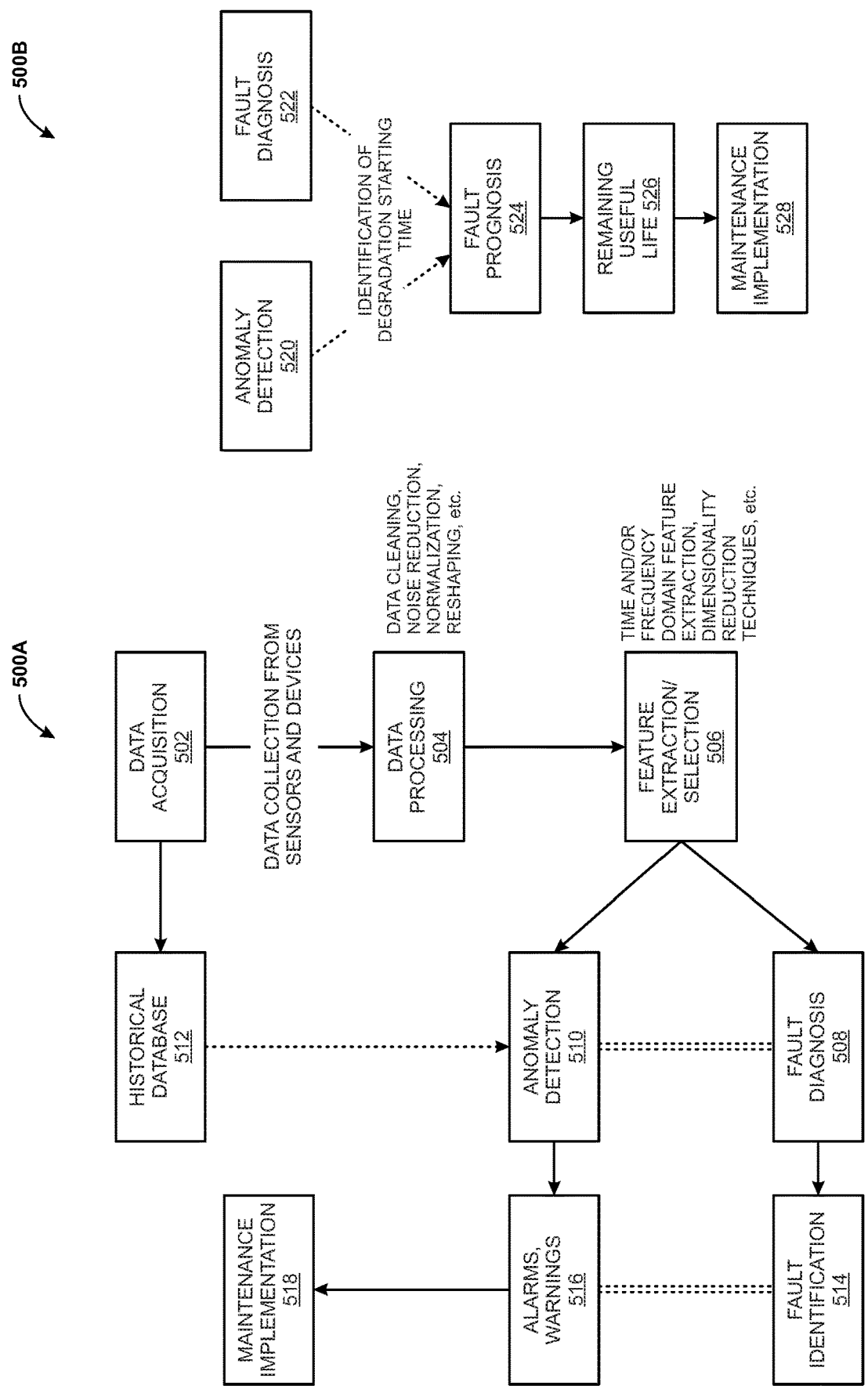
FIG. 5A is a block diagram showing a community-based monitoring mechanism, according to an exemplary embodiment.
FIG. 5B is a block diagram showing a predictive maintenance-based mechanism, according to an exemplary embodiment.

FIG. 5A is a block diagram showing a community-based monitoring mechanism 500A, according to an exemplary embodiment. FIG. 5A is described in conjunction with FIG. 2 and FIG. 4. FIG. 5A shows a block diagram of mechanism 500A related to community-based monitoring and preventive maintenance of the physical objects in the industrial facility. In an embodiment, the community-based monitoring mechanism 500A may include steps of data acquisition 502. For instance, the step of data acquisition 502 may include assimilating data from an interconnected network of sensors and devices in the industrial facility. Further, the collected data may be pre-processed or processed (e.g., 504). that may include data cleaning, noise reduction, normalization, data format reshaping for consistency, etc. Further, the next step in community-based monitoring may include feature extraction and/or selection 506. For example, the feature extraction step may include time and/or frequency domain feature extraction, application of dimensionality reduction techniques, etc.

In an embodiment, the next step in the community-based monitoring mechanism may include fault diagnosis 508 and anomaly detection 510. The machine learning engines 204A of the integrated system 204, in cooperation with the machine learning engines (e.g., 402A through 402H) of the predictive maintenance framework 402, 204H, as shown and described in FIG. 4 and FIG. 2, may execute operations to perform anomaly detection and fault detection operations or functions. The above-described operations or functions performed by the machine learning engines (e.g., 204A, 402A through 402H) may be performed based on the data from multiple data sources (e.g., 202A through 202D). For example, the data may include historical data of the physical objects or physical assets deployed in the industrial entity. Upon execution of operations or functions, the machine learning engines (e.g., 204A, 402A, through 402H) performing the fault detection and/or the anomaly detection may provide suitable information, including identifications or notifications, alarms, warnings, etc. The data or information for maintenance implementation may be generated based on the identifications or notifications, alarms, warnings, etc. In an embodiment, the community-based monitoring mechanism may enable the reduction of inspection frequencies of the physical objects, thereby optimizing or improving the functioning of the physical objects and reducing or minimizing the downtime of the industrial facility.

FIG. 5B is a block diagram showing a predictive maintenance-based mechanism 500B, according to an exemplary embodiment. FIG. 5B is described in conjunction with FIG. 2 and FIG. 4. In an embodiment, the predictive maintenance framework 204H, 402 may implement the steps of preventive maintenance-based mechanism 500B. The predictive maintenance mechanism 500B may include the steps of anomaly detection 520 and fault diagnosis 522 that may make suitable maintenance-related predictions. For example, such predictions may include executing operations to identify or determine a start time of degradation of the physical objects or components of the physical objects in the industrial facility. The asset condition identification engine 402A may execute operations and identify the above-described determinations. In an embodiment, based on anomaly detection that is performed by the anomaly detection engine 402F of the predictive maintenance framework 402, and fault diagnosis is performed by the fault detection engine 404G. The step of fault prognosis 524 may be executed to enable the determination of the remaining useful life (RUL) of the physical objects or components or subcomponents of the physical objects. The current status, including anomalies of the physical objects or components or subcomponents of the physical objects, may be indicated based on a determination of RUL. The determination of RUL may be based on cooperative working of the predictive analysis engine 402D, the analytics and visualization engine 402E, the anomaly detection engine 402F, and the fault detection engine 402G. In an embodiment, the RUL may be determined using the attributes, the threshold values, and the KPIs associated with the parts/components/subcomponents of the physical objects. Based on such determination, the step of maintenance implementation 528 plan or schedule may be generated. For example, the recommendation engine 402H, in cooperation with the predictive analysis engine 402D and the analytics and visualization engine 402E, may enable the generation of recommendations related to the maintenance implementation plan or schedule. In an embodiment, the predictive maintenance-based mechanism 500B may enable planned replacement cycles of the physical objects or the components of the physical objects, thereby optimizing or improving the functioning of the physical objects and reducing or minimizing the downtime of the industrial facility.

Figure 6:
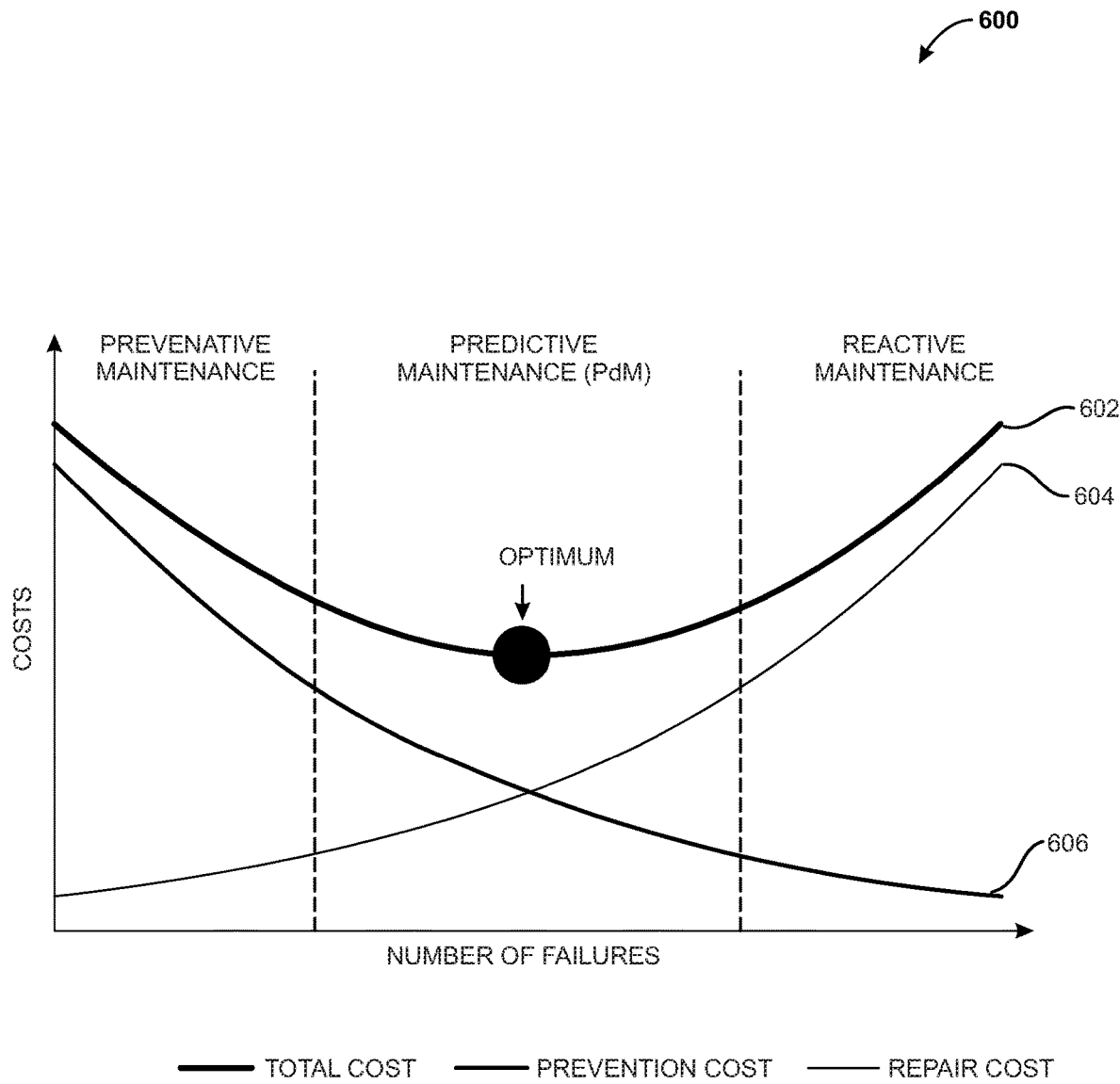
FIG. 6 is an illustration showing a visualization of cost versus failures for different maintenance scenarios, according to an exemplary embodiment.

FIG. 6 is an illustration showing a visualization of cost versus failures for different maintenance scenarios, according to an exemplary embodiment. FIG. 6 is described in conjunction with FIG. 2, FIG. 4, FIG. 5A, and FIG. 5B. FIG. 6 shows an illustration that includes visualizations (e.g., 602, 604, 606) of cost versus the number of failures of physical objects in the industrial facility under different maintenance scenarios. In an embodiment, the different maintenance scenarios may include, for example, a preventive maintenance scenario, a predictive maintenance scenario, and a reactive maintenance scenario. The preventive maintenance scenario may correspond to regular maintenance of equipment and assets to keep them running and prevent any costly unplanned downtime from unexpected equipment failure. The reactive maintenance scenario may correspond to repairing assets to standard operating conditions after poor performance or breakdown is observed.

In an embodiment, the predictive maintenance scenario may correspond to using time series historical and failure data to predict the future potential health of equipment or assets and, therefore, expect problems in advance. Referring to FIG. 6, an optimum point of intersection regarding costs and number of failures is shown when the industrial entity implements the predictive maintenance mechanism 500B. In an embodiment, the integrated system 204, as shown and described in FIG. 2, may enable the implementation of predictive maintenance framework 402, as described with reference to FIG. 4 in the subject specification. Implementation may enable optimizing or improving the functioning of the physical objects, physical assets, or equipment and reducing or minimizing the downtime of the industrial facility.

FIG. 7 is a block diagram 700 showing variations of the modeling techniques for improving accuracies of predictive maintenance, according to an exemplary embodiment. FIG. 7 shows a block diagram 700 that includes machine learning modeling techniques that may be implemented to improve the accuracy of predictive maintenance. For example, the machine learning modeling technique may include a Leverage Model. The Leverage Model may be modeled using a Long-Short Term Memory (LSTM) with the Attention Mechanism technique. The modeling process may include training the machine learning model with the data from multiple data sources. For example, the data sources may include the data or information that may correspond to historical data, domain-specific data, data patterns of failures under different scenarios or circumstances, data patterns of faulty situations or scenarios, etc. The above-described LSTM with attention mechanism may enable increasing the accuracy of predictions. For example, by implementing, the prediction of failure of the physical objects in the industrial entity may be improved.

Referring to FIG. 7, the variations in the machine learning modeling techniques may include predicted label 702 and true label 712. Further, the machine learning modeling mechanism may include training such that positive 704, 708, and negative 706, 710 outcomes may be identified. For example, a true positive (TP) 714, a false positive (FP) 716, a false negative (FN) 718, and a true negative (TN) 720 may be identified by suitable modeling techniques. In an embodiment, the predictions may be improved as shown, for example, predicted 728 is shown regarding the confusion matrix 742. The identifiers, namely positive 730, 724, negative 726, 732, and corresponding TP 734, FP 738, FN 736, and TN 740, may be predicted by implementing the above-described modeling mechanism/technique.

Figure 8:
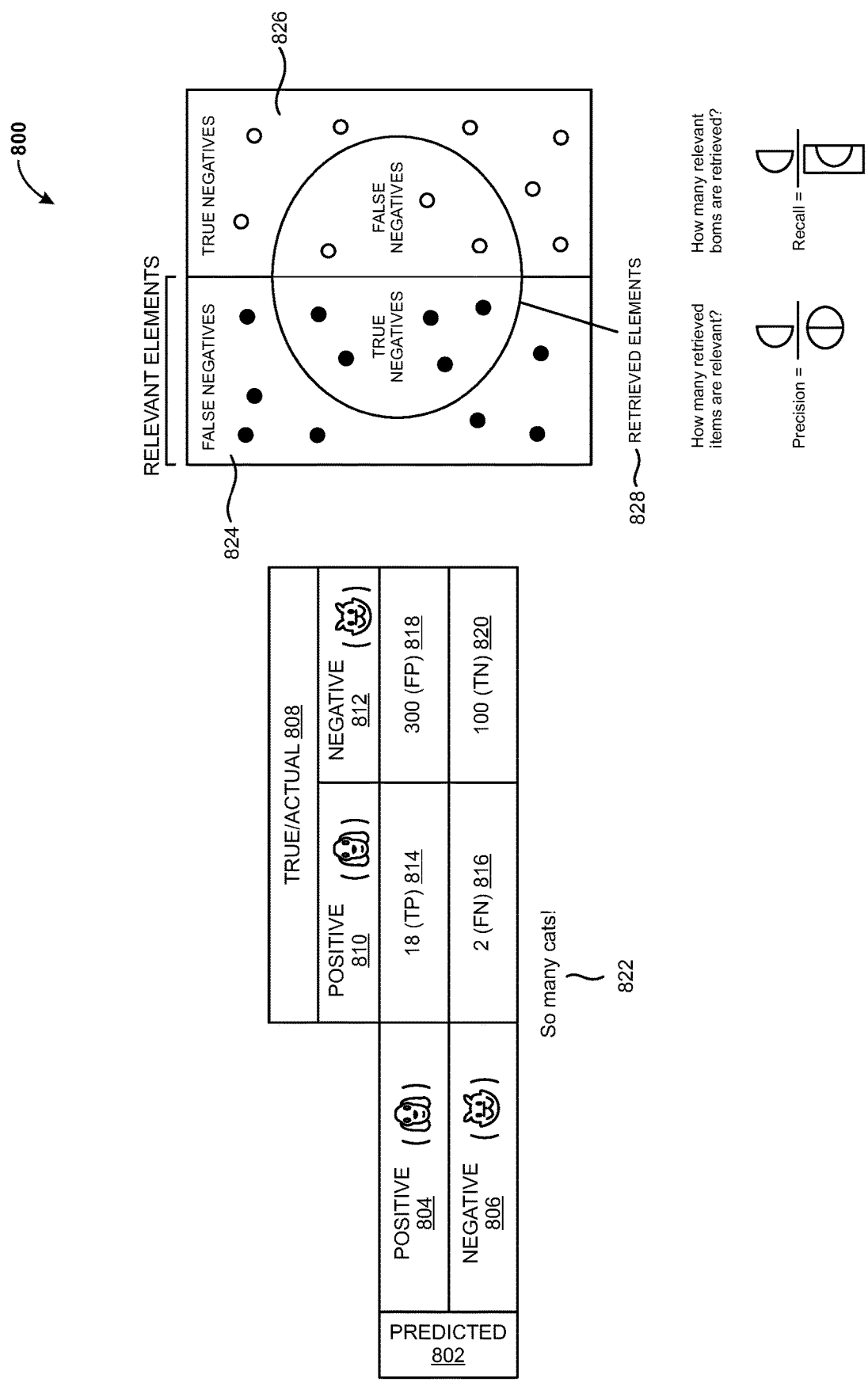
FIG. 8 is a block diagram showing an exemplary training technique, according to an exemplary embodiment.

FIG. 8 is a block diagram showing an exemplary training technique, according to an exemplary embodiment. FIG. 8 is a block diagram 800 showing variations of the modeling techniques or exemplary training mechanisms for improving the accuracies of predictive maintenance. FIG. 8 shows a block diagram 800 that includes machine learning modeling (e.g., implemented using 204B) techniques that may be implemented to improve the accuracy of predictive maintenance. For example, the machine learning modeling technique may include a Matthews Correlation Coefficient (MCC) technique or mechanism. The MCC mechanism may be implemented using the machine learning engines (e.g., 204A, 402A, through 402H) and machine learning models (e.g., 204B) as a measure of the quality of binary and multiclass classifications. The MCC mechanism takes into account true and false positives and negatives. It is generally regarded as a balanced measure that can be used even if the classes are of very different sizes. For example, the data sources may include the data or information that may correspond to historical data, domain-specific data, data patterns of failures under different scenarios or circumstances, data patterns of faulty situations or scenarios, etc. The above-described MCC mechanism may enable increasing the accuracy of predictions. For example, by implementing, the prediction of failure of the physical objects in the industrial entity may be improved.

Referring to FIG. 8, the variations in the machine learning modeling techniques may include true/actual 808 predictions related to so many cats 822. Further, the machine learning modeling mechanism may include training such that positive 804, 810, and negative 806, 812 outcomes may be identified. For example, a true positive (TP) 814, a false positive (FP) 818, a false negative (FN) 816, and a true negative (TN) 820 may be identified by suitable modeling techniques. In an embodiment, the predictions may be improved as shown, for example, false negatives 824 are shown as relevant elements, and true negatives 826. The retrieved elements 828 from the True Negatives corresponding to the relevant elements are as shown in FIG. 8. In an embodiment, the identifiers, namely positive 804, 810, negative 806, 812, and corresponding TP 814, FP 818, FN 816, and TN 820, may be predicted by implementing using or based on the above-described modeling technique or mechanism.

Figure 9:
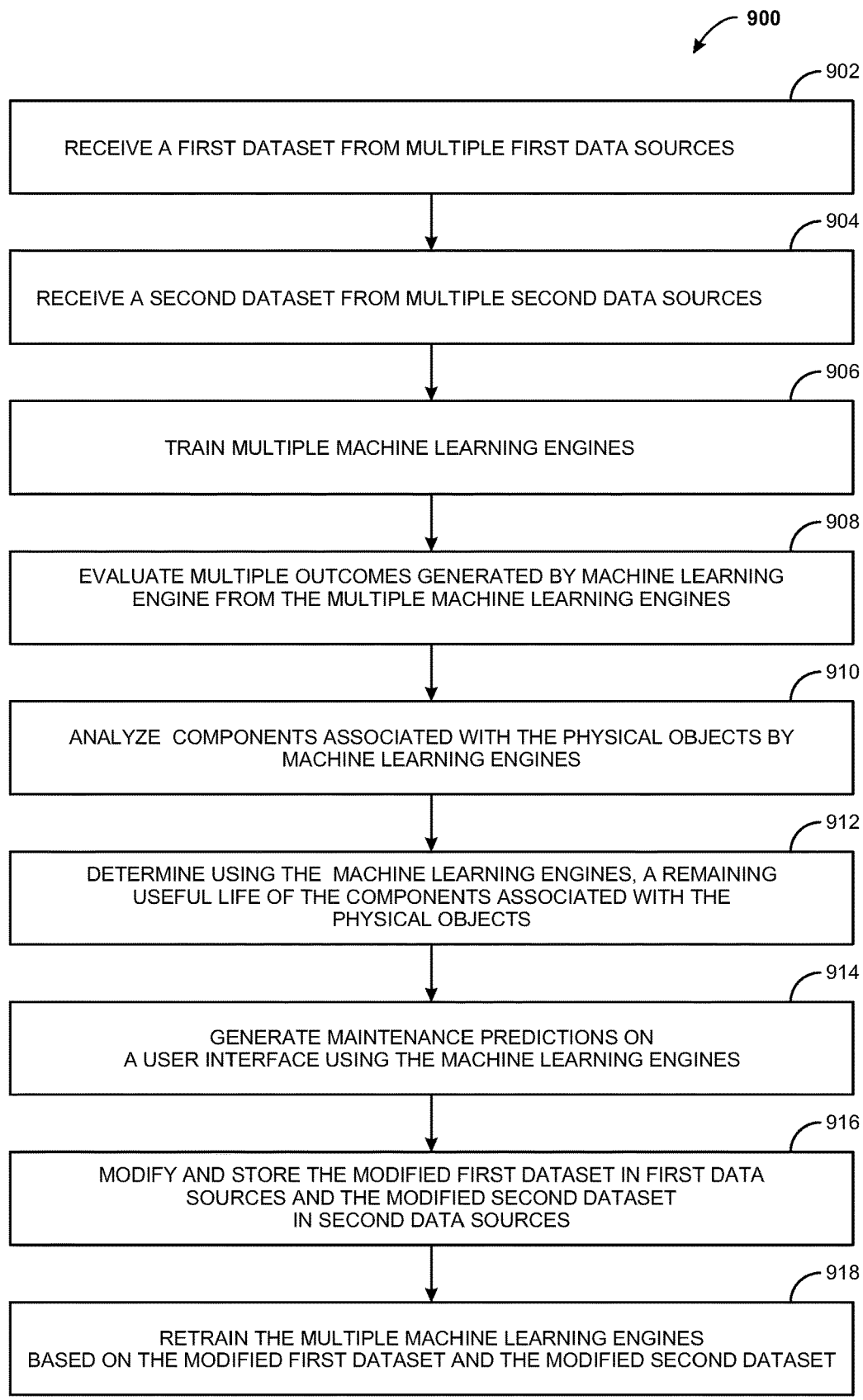
FIG. 9 is a flow diagram showing a process for predictive maintenance, according to an exemplary embodiment.

FIG. 9 is a flow diagram showing a process 900 for predictive maintenance, according to an exemplary embodiment. FIG. 9 is described in conjunction with FIG. 2, FIG. 3 and FIG. 4. FIG. 9 shows a flow diagram of process 900 for implementing the predictive maintenance-based mechanism. At step 902, a dataset, for example, a first dataset from multiple first data sources, is received. The first dataset may include data or information associated with an industrial entity's physical objects or physical assets, which may include manufacturing equipment, material handling equipment, control systems and sensors, process equipment, etc. At step 904, a second dataset from multiple secondary data sources is received. The second dataset may include information or data the plurality of second data sources includes data associated with multiple components associated with the physical objects. The second dataset may include data related to one or more historical maintenance data, historical failure data, data from external sources, and instruction manuals. At step 906, multiple machine learning engines are trained. For example, the machine learning engines may be trained as described in detailed description with reference to FIG. 2.

Based on the training, at step 908, multiple outcomes may be evaluated by the multiple machine learning engines. The multiple outcomes may indicate the current status of one or more components associated with the multiple physical objects. At step 910, the one or more components associated with the physical objects are analyzed by one or more machine learning engines. For instance, the analysis is using or based on one or more technical metrics associated with one or more components and one or more threshold values associated with one or more components. Based on the analysis, at step 912, using one or more machine learning engines, the remaining useful life of one or more components associated with the physical objects is determined. The remaining useful life may be analyzed using the machine learning engines based on threshold values associated with, for example, operational parameters associated with the physical objects, the anomalies of the components or subcomponents, etc.

Based on the determination, at step 916, maintenance predictions associated with the physical objects are generated on a user interface using one or more machine learning engines. For instance, one or more maintenance predictions are associated with one or more components or one or more subcomponents and may be generated by using a measure of key performance indicators associated with one or more components associated with the plurality of physical objects. At step 916, the first dataset is modified and stored in one or more first data sources, and the second dataset is modified and stored in one or more second data sources. At step 918, the machine learning engines are retrained. The machine learning engines are retrained as described in detailed description with reference to FIG. 2. The operational efficacies of steps 902 through 918 are implemented by the integrated system 204, including all the modules, components, engines, models, platforms, predictive maintenance framework, or subsystems as described in the detailed description of FIG. 2.

In an embodiment, the system method described above that implements the predictive maintenance framework in an industrial entity may provide several technical advantages such as improved productivity, such that, by moving from unplanned downtime to planned downtime, the system can improve productivity by enabling the industrial entity to schedule maintenance during less busy times, reducing the impact of downtime on production. Further technical advantages may include optimized processes such that the system may optimize processes by identifying potential issues before they become major problems, allowing the industrial entity to address them proactively and improve overall efficiency. Further technical advantages may include improved quality where the machine learning engines are used to analyze the data from multiple sources (e.g., internal, external, manuals, etc.) and predict maintenance needs, the system can help ensure that quality standards are met and that products are of high quality. Further technical advantages may include upskilling the workforce, such that the system may upskill the workforce by providing them with real-time data and insights on maintenance needs, enabling them to make informed decisions and improve their skills.

In an embodiment, further technical advantages may include simplified compliance, such that the system may simplify adhering to compliance by providing a centralized platform for storing and managing maintenance data, making it easier for industrial entities to meet regulatory requirements. Further technical advantages may include reducing costs related to maintenance, such that, by enabling extended asset life and decreasing downtime, the system can reduce costs related to maintenance, such as equipment replacement and repair costs. Further technical advantages may include increased workplace safety. By predicting potential safety hazards and addressing them proactively, the system can improve workplace safety and reduce the risk of accidents.

In an embodiment, the method for training and retraining the multiple machine learning engines in the predictive maintenance framework may provide technical advantages of improved accuracy, such that by using multiple machine learning engines to analyze data and generate maintenance predictions, the predictive maintenance framework may improve accuracy by reducing the impact of any single engine's biases or errors. Further technical advantages may include increased efficiency, such that the training and re-training methods of the machine learning engines in the predictive maintenance framework may increase efficiency by leveraging the strengths of different machine learning engines and combining their predictions to generate more accurate maintenance predictions. Further technical advantages may include better scalability, such that training and re-training multiple machine learning engines in the predictive maintenance framework may improve scalability by enabling the handling of larger volumes of data and providing faster responses to changing conditions. Further technical advantages may include improved adaptability, such that the predictive maintenance framework may improve adaptability by enabling the system to adapt to new data and insights, enabling it to improve maintenance predictions and decisions continuously. Further technical advantages may include enhanced customization, such that by using the multiple machine learning engines with different strengths and weaknesses, the predictive maintenance framework may enhance customization by providing more tailored maintenance predictions based on specific industrial entities' needs.

Figure 10:
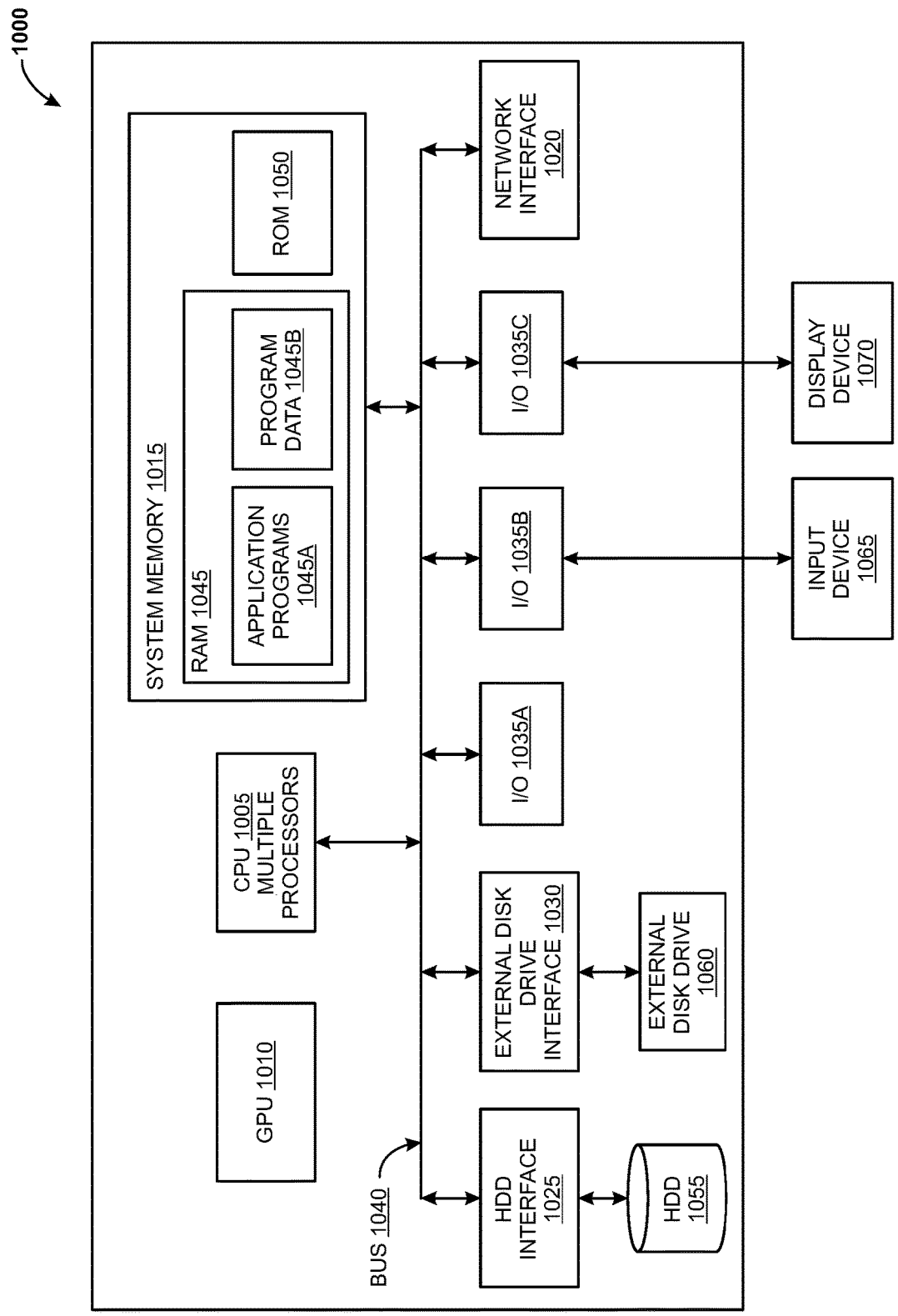
FIG. 10 shows an exemplary hardware configuration of a computer that may implement components of the integrated system, according to exemplary embodiments.

FIG. 10 shows an exemplary hardware configuration of a computer 1000 that may implement components of the integrated system 204, according to exemplary embodiments. The computer 1000 shown in FIG. 10 includes CPU 1005, GPU 1010, system memory 1015, network interface 1020, hard disk drive (HDD) interface 1025, external disk drive interface 1030, and input/output (I/O) interfaces 1035A, 1035B, 1035C. These computer elements are coupled with each other via system bus 1040. The CPU 1005 may perform arithmetic, logic, and/or control operations by accessing system memory 1015. The CPU 1005 may implement the processors of the exemplary devices and/or systems described above. The GPU 1010 may perform operations for processing graphic or AI tasks. In case computer 1000 is used to implement an exemplary central processing device, GPU 1010 may be GPU 1010 of the exemplary central processing device as described above. The computer 1000 does not include GPU 1010, for example, in case the computer 1000 is used for implementing a device other than a central processing device. The system memory 1015 may store information and/or instructions in combination with the CPU 1005. The system memory 1015 may include volatile and non-volatile memory, such as random-access memory (RAM) 1045 and read-only memory (ROM) 1050. A basic input/output system (BIOS) containing the basic routines that help to transfer information between elements within the computer 1000, such as during start-up, may be stored in ROM 1050. The system bus 1040 may be any of several types of bus structures, including a memory bus or memory controller, a peripheral bus, and a local bus using various bus architectures.

The computer may include a network interface 1020 for communicating with other computers and/or devices via a network.

Further, the computer may include a hard disk drive (HDD) 1055 for reading from and writing to a hard disk (not shown) and an external disk drive 1060 for reading from or writing to a removable disk (not shown). The removable disk may be a magnetic disk for a magnetic disk drive or an optical disk such as a CD ROM for an optical disk drive. The HDD 1055 and external disk drive 1060 are connected to the system bus 1040 by HDD interface 1025 and external disk drive interface 1030, respectively. The drives and their associated non-transitory computer-readable media provide non-volatile storage of computer-readable instructions, data structures, program modules, and other data for the general-purpose computer. The relevant data may be organized in a database, for example, a relational or object database.

Although the exemplary environment described herein employs a hard disk (not shown) and an external disk (not shown), it should be appreciated by those skilled in the art that other types of computer-readable media can store data that is accessible by a computer, such as magnetic cassettes, flash memory cards, digital video disks, random access memories, read-only memories, and the like, may also be used in the exemplary operating environment.

Several program modules may be stored on the hard disk, external disk, ROM 1050, or RAM 1045, including an operating system (not shown), one or more application programs 1045A, other program modules (not shown), and program data 1045B. The application programs may include at least a part of the functionality as described above.

The computer 1000 may be connected to input device 1065, such as mouse and/or keyboard, and display device 1070, such as liquid crystal display, via corresponding I/O interfaces 1035A to 1035C and the system bus 1040. In addition to implementing a computer 1000, as shown in FIG. 10, a part or all the functionality of the exemplary embodiments described herein may be implemented as one or more hardware circuits. Examples of such hardware circuits may include but are not limited to Large Scale Integration (LSI), Reduced Instruction Set Circuits (RISC), Application Specific Integrated circuits (ASIC), and Field Programmable Gate Arrays (FPGA).

One or more embodiments are now described with reference to the drawings, wherein like reference numerals are used to refer to like elements throughout. In the following description, numerous specific details are set forth to provide a thorough understanding of the various embodiments. It is evident, however, that the various embodiments can only be practiced with these specific details (and without applying them to any networked environment or standard).

As used in this application, in some embodiments, the terms "component," "system," and the like are intended to refer to, or comprise, a computer-related entity or an entity related to an operational apparatus with one or more specific functionalities, wherein the entity can be either hardware, a combination of hardware and software, software, or software in execution. For example, a component may be a process running on a processor, an object, an executable, a thread of execution, computer-executable instructions, a program, and/or a computer. By way of illustration and not limitation, both an application running on a server and the server can be a component.

The above descriptions and illustrations of embodiments, including what is described in the Abstract, are not intended to be exhaustive or to limit one or more embodiments to the precise forms disclosed. While specific embodiments of, and examples for, one or more embodiments are described herein for illustrative purposes, various equivalent modifications are possible within the scope, as those skilled in the relevant art will recognize. These modifications can be made considering the above-detailed description. Rather, the scope is to be determined by the following claims, which are to be interpreted in accordance with established doctrines of claim construction.

As used in this application, the terms "circuits" and "circuitry" refer to physical, electronic components (for example, hardware) and any software and/or firmware ("code") that may configure the hardware, be executed by the hardware, and/or otherwise be associated with the hardware. For example, a particular processor, and memory may comprise a first "circuit" when executing the first one or more lines of code. They may comprise a second "circuit" when executing the second one or more lines of code. As used in this application, "and/or" means any one or more of the items in the list joined by "and/or." As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. The term "exemplary" means serving as a non-limiting example, instance, or illustration. The terms "e.g." and "for example" set off lists of one or more non-limiting examples, instances, or illustrations. The circuitry is "operable" to perform a function whenever the circuitry comprises the necessary hardware and/or code (if any is necessary) to perform the function, regardless of whether the performance of the function is disabled or not enabled by some user-configurable setting.

The terminology used herein is to describe particular embodiments only and is not intended to be limiting to embodiments of the disclosure. The singular forms "a," "an," and "the" should include the plural forms as well, unless the context clearly indicates otherwise. It will be further understood that the terms "comprises," "comprising," "includes," and/or "including," when used herein, specify the presence of stated features, integers, steps, operations, elements, and/or components but do not preclude the presence or addition of one or more other features, integers, steps, operations, elements, components, and/or groups thereof.

Further, those skilled in the art will appreciate that the various illustrative logical blocks, modules, circuits, algorithms, and/or steps described in connection with the embodiments disclosed herein may be implemented as electronic hardware, computer software, firmware, or combinations thereof. To illustrate this interchangeability of hardware and software, various illustrative components, blocks, modules, circuits, and steps have been described above in terms of functionality. Whether such functionality is implemented as hardware or software depends upon the particular application and design constraints imposed on the overall system. Skilled artisans may implement the described functionality in varying ways for each application. Still, such implementation decisions should be interpreted as staying within the scope of the present disclosure.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps, and/or actions of the method claim in accordance with the embodiments of the disclosure described herein need not be performed in any order. Although elements of the disclosure may be described or claimed in the singular, the plural is contemplated unless a limitation to the singular is specified. Therefore, it is intended that the present disclosure is not limited to the particular embodiment disclosed, but that the present disclosure will include all embodiments falling within the scope of the appended claims.

What is claimed is:

1. A system for implementing a predictive maintenance framework in an industrial entity, comprising:
   a processor;
   a memory storing instructions, which when executed by the processor, causes the system to:
      receive a first dataset from a plurality of first data sources, wherein the first dataset includes data associated with a plurality of physical objects, including one or more manufacturing equipment, material handling equipment, control systems and sensors, and process equipment in an industrial entity;
      receive a second dataset from a plurality of second data sources, wherein the plurality of second data sources includes data associated with a plurality of components associated with the plurality of physical objects related to one or more historical maintenance data, historical failure data, data from external sources, and instruction manuals;
      based on the first dataset and the second dataset, train a plurality of machine learning engines;
      based on the training, evaluate a plurality of outcomes generated by at least one machine learning engine from the plurality of machine learning engines, wherein the plurality of outcomes indicates a current status of one or more components or one or more subcomponents associated with the plurality of physical objects;
      based on the plurality of outcomes, analyze the one or more components or the one or more subcomponents associated with the plurality of physical objects by one or more machine learning engines, wherein the analysis uses one or more technical metrics associated with the one or more components or the one or more subcomponents, and one or more threshold values associated with the one or more components or the one or more subcomponents;
      based on the analysis, determine using the one or more machine learning engines, a remaining useful life of the one or more components or the one or more subcomponents associated with the physical objects;
      based on the determination, generate one or more maintenance predictions on a user interface using the one or more machine learning engines, wherein the one or more maintenance predictions are associated with the one or more components or the one or more subcomponents, wherein the one or more maintenance predictions are generated by using a measure of key performance indicators associated with the one or more components or the one or more subcomponents associated with the plurality of physical objects;
      modify and store a modified first dataset in one or more first data sources and a modified second dataset in one or more second data sources, wherein the modified first dataset and the modified second dataset are generated using the generated one or more maintenance predictions and the determined remaining useful life of the one or more components or the one or more subcomponents associated with the plurality of physical objects; and
      retrain the plurality of machine learning engines based on the modified first dataset and the modified second dataset.

2. The system of claim 1, wherein the memory comprises instructions, which when executed by the processor, causes the system to evaluate the plurality of outcomes, is based on an analysis using the received first dataset, the received second dataset, and a test dataset.

3. The system of claim 1, further comprising instructions, which when executed by the processor, cause the system to: determine a current status of the one or more physical objects based on data associated with one or more key performance indicators associated with a working condition of the one or more physical objects.

4. The system of claim 1, further comprising instructions, which when executed by the processor, cause the system to:
   pre-process the first data, the second dataset, the modified first dataset, and the modified second dataset; and
   based on the pre-processing, classify the first dataset, the second dataset, the modified first dataset, and the modified second dataset.

5. The system of claim 1, further comprising instructions, which when executed by the processor, cause the system to: generate one or more visualizations associated with a plurality of key performance indicators associated with the plurality of physical objects, wherein the one or more visualizations provide one or more insights into one or more predictions of failures of the one or more physical objects.

6. The system of claim 1, wherein the memory comprises instructions, which when executed by the processor, cause the system to: generate one or more maintenance predictions of the one or more physical objects provides adherence to compliance via a centralized platform for storing, managing maintenance data and meeting regulatory requirements.

7. The system of claim 1, wherein the memory comprises instructions, which when executed by the processor, cause the system to: the one or more maintenance predictions provide information on a start time of degradation of the one or more physical objects, and a remaining useful life associated with the one or more physical objects.

8. The method of claim 1, wherein evaluating the plurality of outcomes is based on an analysis using the received first dataset, the received second dataset, and a test dataset.

9. The method of claim 1, further comprising: determining a current status of the one or more physical objects based on data associated with one or more key performance indicators associated with a working condition of the one or more physical objects.

10. The method of claim 1, further comprising:
    pre-processing the first data, the second dataset, the modified first dataset, and the modified second dataset; and
    based on the pre-processing, classifying the first dataset, the second dataset, the modified first dataset, and the modified second dataset.

11. The method of claim 1, further comprising: generating one or more visualizations associated with a plurality of key performance indicators associated with the plurality of physical objects, wherein the one or more visualizations provide one or more insights into one or more predictions of failures of the one or more physical objects.

12. The method of claim 1, wherein generating one or more maintenance predictions of the one or more physical objects provides adherence to compliance via a centralized platform for storing, managing maintenance data, and meeting regulatory requirements.

13. The method of claim 1, wherein the one or more maintenance predictions provide information on a start time of degradation of the one or more physical objects, and a remaining useful life associated with the one or more physical objects.

14. A non-transitory computer-readable device having instructions stored thereon that, when executed by at least one computing device, causes the at least one computing device to perform operations comprising:
  receiving a first dataset from a plurality of first data sources, wherein the first dataset includes data associated with a plurality of physical objects, including one or more manufacturing equipment, material handling equipment, control systems and sensors, and process equipment in an industrial entity;
  receiving a second dataset from a plurality of second data sources, wherein the plurality of second data sources includes data associated with a plurality of components associated with the plurality of physical objects related to one or more historical maintenance data, historical failure data, data from external sources, and instruction manuals;
  based on the first dataset and the second dataset, training a plurality of machine learning engines;
  based on the training, evaluating a plurality of outcomes generated by at least one machine learning engine from the plurality of machine learning engines, wherein the plurality of outcomes indicates a current status of one or more components or one or more subcomponents associated with the plurality of physical objects;
  based on the plurality of outcomes, analyzing the one or more components or the one or more subcomponents associated with the plurality of physical objects by one or more machine learning engines, wherein the analysis is based on one or more technical metrics associated with the one or more components or the one or more subcomponents, and one or more threshold values associated with the one or more components or the one or more subcomponents;
  based on the analysis, determining using the one or more machine learning engines, a remaining useful life of the one or more components or the one or more subcomponents associated with the physical objects;
  based on the determination, generate one or more maintenance predictions on a user interface using the one or more machine learning engines, wherein the one or more maintenance predictions are associated with the one or more components or the one or more subcomponents, wherein the one or more maintenance predictions are generated by using a measure of key performance indicators associated with the one or more components or the one or more subcomponents associated with the plurality of physical objects;
  modifying and storing a modified first dataset in one or more first data sources and a modified second dataset in one or more second data sources, wherein the modified first dataset and the modified second dataset are generated using the generated one or more maintenance predictions and the determined remaining useful life of the one or more components or the one or more subcomponents associated with the plurality of physical objects; and
  retraining the plurality of machine learning engines based on the modified first dataset and the modified second dataset.

15. The non-transitory computer-readable device of claim 14, wherein evaluating the plurality of outcomes is based on an analysis using the received first dataset, the received second dataset, and a test dataset.

16. The non-transitory computer-readable device of claim 14, further comprising: determining a current status of the one or more physical objects based on data associated with one or more key performance indicators associated with a working condition of the one or more physical objects.

17. The non-transitory computer-readable device of claim 14, further comprising:
  pre-processing the first data, the second dataset, the modified first dataset, and the modified second dataset; and
  based on the pre-processing, classifying the first dataset, the second dataset, the modified first dataset, and the modified second dataset.

18. The non-transitory computer-readable device of claim 14, further comprising: generating one or more visualizations associated with a plurality of key performance indicators associated with the plurality of physical objects, wherein the one or more visualizations provide one or more insights into one or more predictions of failures of the one or more physical objects.

19. The non-transitory computer-readable device of claim 14, wherein generating one or more maintenance predictions of the one or more physical objects provides adherence to compliance via a centralized platform for storing, managing maintenance data, and meeting regulatory requirements.

20. A method for implementing a predictive maintenance framework in an industrial entity, comprising:
  receiving a first dataset from a plurality of first data sources, wherein the first dataset includes data associated with a plurality of physical objects, including one or more manufacturing equipment, material handling equipment, control systems and sensors, and process equipment in an industrial entity;
  receiving a second dataset from a plurality of second data sources, wherein the plurality of second data sources includes data associated with a plurality of components associated with the plurality of physical objects related to one or more historical maintenance data, historical failure data, data from external sources, and instruction manuals;
  based on the first dataset and the second dataset, training a plurality of machine learning engines;
  based on the training, evaluating a plurality of outcomes generated by at least one machine learning engine from the plurality of machine learning engines, wherein the plurality of outcomes indicates a current status of one or more components or one or more subcomponents associated with the plurality of physical objects;
  based on the plurality of outcomes, analyzing the one or more components or the one or more subcomponents associated with the plurality of physical objects by one or more machine learning engines, wherein the analysis is based on one or more technical metrics associated with the one or more components or the one or more subcomponents, and one or more threshold values associated with the one or more components or the one or more subcomponents;

based on the analysis, determining using the one or more machine learning engines, a remaining useful life of the one or more components or the one or more subcomponents associated with the physical objects;

based on the determination, generate one or more maintenance predictions on a user interface using the one or more machine learning engines, wherein the one or more maintenance predictions are associated with the one or more components or the one or more subcomponents, wherein the one or more maintenance predictions are generated by using a measure of key performance indicators associated with the one or more components or the one or more subcomponents associated with the plurality of physical objects;

modifying and storing a modified first dataset in one or more first data sources and a modified second dataset in one or more second data sources, wherein the modified first dataset and the modified second dataset are generated using the generated one or more maintenance predictions and the determined remaining useful life of the one or more components or the one or more subcomponents associated with the plurality of physical objects; and retraining the plurality of machine learning engines based on the modified first dataset and the modified second dataset.

* * * * *